United States Patent [19]

Dashiell et al.

[11] Patent Number: 4,843,542
[45] Date of Patent: Jun. 27, 1989

[54] VIRTUAL MEMORY CACHE FOR USE IN MULTI-PROCESSING SYSTEMS

[75] Inventors: Stephen R. Dashiell, Pasadena; Bindiganavele A. Prasad, Torrance; Ronald E. Rider, Menlo Park; James A. Steffen, Long Beach, all of Calif.

[73] Assignee: Xerox Corporation, Stamford, Conn.

[21] Appl. No.: 930,172

[22] Filed: Nov. 12, 1986

[51] Int. Cl.⁴ .................. G06F 12/00; G06F 12/06; G06F 13/00

[52] U.S. Cl. .................. 364/200; 364/243; 364/243.4; 364/243.41; 364/243.44

[58] Field of Search ... 364/200 MS File, 900 MS File

[56] References Cited

U.S. PATENT DOCUMENTS

| | | | |
|---|---|---|---|
| 4,394,731 | 7/1983 | Flusche et al. | 364/200 |
| 4,453,230 | 6/1984 | Mizoguchi et al. | 364/900 |
| 4,481,573 | 11/1984 | Fukunaga et al. | 364/200 |
| 4,484,267 | 11/1984 | Fletcher | 364/200 |
| 4,539,637 | 9/1985 | DeBruler | 364/200 |
| 4,616,310 | 10/1986 | Dill et al. | 364/200 |
| 4,622,631 | 11/1986 | Frank et al. | 364/200 |
| 4,658,356 | 4/1987 | Shiozaki et al. | 364/200 |

Primary Examiner—Eddie P. Chan
Assistant Examiner—Joseph T. Fitzgerald
Attorney, Agent, or Firm—Robert E. Cuhya

[57] ABSTRACT

A system for maintaining data consistency among distributed processors, each having its associated cache memory. A processor addresses data in its cache by specifying the virtual address. The cache will search its cells for the data associatively. Each cell has a virtual address, a real address, flags and a plurality of associated data words. If there is no hit on the virtual address supplied by the processor, a map processor supplies the equivalent real address which the cache uses to access the data from another cache if one has it, or else from real memory. When a processor writes into a data word in the cache, the cache will update all other caches that share the data before allowing the write to the local cache.

12 Claims, 14 Drawing Sheets

VIRTUAL MEMORY CACHE FOR USE IN MULTI-PROCESSING SYSTEMS

BACKGROUND OF THE INVENTION

This is a parallel processing system for enabling efficient distributed processing by providing each processor with its own cache memory and additional hardware in the cache to prevent multiple copies of the data from being modified improperly by competing processors.

Cache memories are usually discussed in terms of a small highspeed "scratch-pad" memory being maintained near the associated processor, or on the same chip, to speed up the fetch or store time. Data is swapped between the cache and the main memory when needed, and there is no consistency problem. The consistency problem appears when there are multiple processors, each with its own cache memory. Then the data may become inconsistent between cache chips.

In a distributed processing system such as the electronic subsystem of a copier/printer, there may be one or more processors for each main unit such as the output scanner, input scanner and display, all processors communicating through a common data bus. Each processor may have its own local, or cache, memory, and operate independently of the others.

In some cases one processor is not enough to control a machine function. An example would be where there is a significant amount of image manipulation in the form of enhancement, compression, rotation and the like. These operations consume large amounts of computer power, and typically must be processed rapidly. In this case, either a larger processor, or several processors in parallel, must be used.

As a matter of economy, it is convenient to design one basic set of processor and memory chips, and use them for all applications. Therefore, it would be advantageous to have a system where each machine function uses one or several identical parallel, or concurrent, processors and cache memories, resulting in a significant number of parallel processors for the entire system.

In many of these cases there is information that must be shared by several processors, and this data must be stored in a central memory. In the case where common data is needed by several processors, there is a possibility that two processors may access and modify the same data packet, resulting in two versions. Some software or hardware system must be put in place to prevent this. One obvious way is to flag any data in main memory that has been accessed by one processor, and inhibit any other processor from using that data until the first processor returns the updated version to main memory. This results in a transfer of the problem to the software to an extent, and may slow the system speed which, of course, defeats the purpose of having parallel processing in the first place.

An alternative is for any cache memory that has updated a line of data to invalidate the same data wherever it is stored in any other cache, and at the same time, write the new data into main memory. Then, any other cache must reload that data from memory before using it. This system takes a certain amount of time, and degrades system performance.

In virtual memory systems, in addition to the problem of maintaining consistency, there is also the problem of translating virtual to real addresses. This occurs because the entire data base is typically stored on a disk as virtual memory, the pages currently being accessed are stored in main memory as real memory, and the processors ask for data by using the virtual address. When a processor issues a virtual address, a look-up of some kind is required to translate that into a real address to determine if it is available in the real memory.

As a numerical example, assume that the virtual address is 24 bits, and each word is 16 bits, resulting in a total memory capacity of 256 Mbits. There will be 512 bytes to a page, so the total number of pages is 64K. Then, if there is one entry for each page, there would be 64K entries, which would be a reasonable map table if kept in main memory. Then, for every virtual address received, the memory could get a page address, and use that to address itself to get the data. Of course this is a slow process because there are two address cycles per fetch, and that is assuming that the data is in real memory. If not, it must be fetched from virtual memory.

There are some chip sets that get around this problem to some extent by storing the most significant bits of the most recently used addresses, to limit the size of the conversion table, and to speed up the process. The effect is to cache a part of the address map as well as the data.

Ultimately, the goal is to create a system which will simultaneously maintain data consistency and high speed. Stated another way, the problem is to optimize the caching of both the address map and the data.

There are two main types of systems used in the prior art. In one system, the processors will ask for data by specifying the real address, and the cache, which contains a CAM (content addressable memory) containing the real addresses of the data in RAM (randon access memory) will directly supply the data if it is available. The other type is where the processor asks for data by specifying the virtual address and the real memory's memory management unit must convert that to a real address before supplying the data. What is needed is a system where the processor can ask for the data by its virtual address, and the cache will supply it directly. Of course, the system must also maintain high speed and consistency of data.

A review of the prior art was published by Katz et al, entitled "Implementing a Cache Consistency Protocol, International Symposium on Computer Architecture (12th: 1985: Boston, Mass). There is described "The Berkeley Ownership Protocol" which advances the concept of Ownership of data blocks. Owning the block allows the Owner to update the data, and obligates the Owner to provide data to requesting caches, and to update the memory when the block is replaced in the cache. If the data is Owned Exclusively then the cache can write into it without informing other caches. The UnOwned state carries no responsibilities or privileges, the data can not be written into without acquiring Ownership, which takes a special set of instructions. In Non-exclusive Ownership, data is written into the local block, and the shared data in all other caches is invalidated. The main difference between this prior system and the invention described below is that in this invention in addition to providing virtual memory support any processor can write into its cache at any time, whether the data is shared or not, and automatically become the "master" of that data without the requirement of acquiring the Ownership first. Detection of "shared" state and doing a write-thru to update other caches is done only when necessary in an optimal way that is transparent to the processor.

SUMMARY OF THE INVENTION

In the following discussion it will be assumed that the virtual memory is stored on a disk, that the real memory is contained in a solid state main memory, and that pages of data are swapped between the virtual and main memories as required. In addition, there are a number of cache memories connected by a main bus, called an M Bus, to the main memory, each cache memory being connected, in the simplest case, to a processor. Each processor will address data in terms of its virtual address, the existence of the real memory being transparent to the processor. In operation when a packet of data is required by a processor, the cache either supplies it from its own memory, or gets it from the main memory via the M Bus. The cache, prior to requesting a packet of data, ascertains that it is resident in main memory, and if not, initiates a process to transfer it from disk to main memory. The result is that there is an M Bus through which all transactions take place, this bus being connected to one port of the main memory and one port on each of the cache memories. The other port of each cache is tied directly to its associated processor. In this system the disk is just another peripheral, communicating through its own processor and cache memory, and then through the M Bus, to the main memory.

Each cache chip has built-in hardware to prevent there being two different copies of the same data packet in the system. Essentially, the process is for every cache chip to monitor the bus, and to keep track of whether other caches have the same data. Then, when one cache modifies the data, it puts out a command to the other caches in the system signifying that a modification is taking place so that an identical modification of the data in all other caches can take place. This is faster than the prior art method since store and fetch operations involving main memory are much slower than cache memory cycles, and because the write-through happens only during the time that the data is shared. The further implications of this system are that, if a cache request data on the M bus and it already exists in another cache, the master will supply it instead of having the real memory supply it, and only the master needs to update the real memory if the data is victimized.

This algorithm imposes minimum overhead on the main bus because the write-through takes only two clocks on the M bus, is initiated only if the data is shared, involves only the other caches, and does not involve main memory. In addition, the modification is fully described in one 32 bit word, most data packets are not shared, and write operations, as opposed to read and process operations, during the execution of machine control programs, are less frequent. In actual practice, processing rates, in spite of inhibitions in the case of write operations, range above 95%. Another aspect of the system that results in minimum delay is that the packet size is kept small to minimize write delays. The data is typically transmitted in 128 bit packets, comprising four 32 bit words, a "quad word" or an "octet" of eight 16 bit words, (there are 32 octets per page which has 512 bytes). More specifically, each 128 bit packet of data has an associated "shared flag", so that when the data is written into, the cache will know that another cache memory must also be modified. Then the writing processor will be held up until all other caches are updated, the updating process being the transmission onto the MBUS the real memory address of the data, and the new data. An additional feature of this system is that the processors connected to the monitoring caches proceed uninhibited during this update process.

Another feature of this system is that the virtual-to-real address table look-up in the cache, which contains sixteen pairs of equivalent addresses, will supply the real address under some circumstances where the required virtual address is not in the cache. This can happen where the virtual address of the data word is on the same page as another word whose address is in the cache. Then the cache supplies the most significant bits of the real address to which are added the least significant bits of the virtual address to create the complete real address. The hardware of the cache includes a circuit to implement this function.

This described system uses 16 bit processors and a 32 bit M bus. Therefore, a 32 bit word can be used to describe the modification made on the data by one of the processors. The storage of the cache is 2K bits, which, of course, is a trade off. A larger memory would have to be swapped less often from real memory, but a smaller memory would be less costly. The resultant parallel architecture can be adapted for systems ranging in size from work stations or terminals to large printer/duplicators, with up to 25 processing channels, and with as many as 30 or 35 cache memory chips. If the data is not in real memory, then another cache that is being used to connect the M bus to the disk containing the virtual memory will, with the help of its associated processor, transfer data from virtual memory to real memory. There is also an option of the system having two main buses, one for the scanner input station, and one for the printer output, since these two main groups of components in a copier/duplicator are not tightly coupled.

It has been assumed that any processing channel has access to the main bus. However, this is an arbitrated function. The system has a bus arbitor connected by a separate bus to all channels to decide between competing channels which will get control of the main bus on the next clock cycle. This arbitration bus is a star network, each cache connected to the arbitor by one line going to the arbitor, and one line coming back. The process is for each channel to request access of the arbitor, and to initiate the bus transaction only after receiving permission from the arbitor. The basic transaction on the bus is 128 bits transferred in four clock cycles, but as stated above, a cache can take control of the data bus for as little as two cycles, for a single word write, or longer for other transactions.

DETAILED DESCRIPTION OF THE INVENTION

Figure 1:
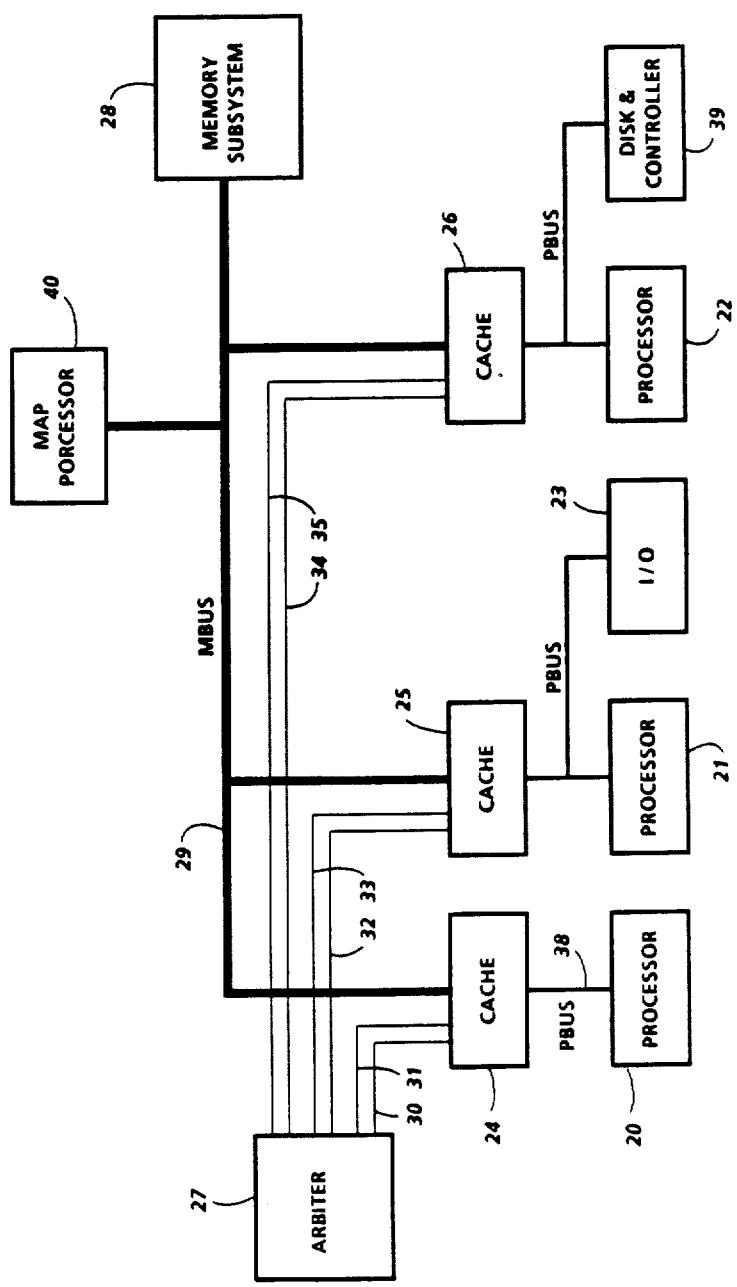
FIG. 1 is a simplified block diagram of the system showing how the processors and cache memories are connected to the main memory and arbitor.

FIG. 1 is a simple overall block diagram of the system architecture. The central M Bus 29 is connected to the memory 28 and to each cache 24, 25, 26. It is assumed that more caches are connected to the bus. This is a 32 line bus, and all data transactions between the caches themselves, and between the caches and memory are transmitted on this bus.

Each cache is also connected to its processor 20, 21, 22. An option would be to connect two or more caches to each processor. In this regard, the processor can be in the form of any hardware unit that has the processing power to appear to the cache to be a processor, such as the I/O unit 23. The bus connecting the cache to its processor is called the P Bus 38 in this described embodiment. It can now be seen that although there are a number of options allowed in the connection of caches, the one absolute rule is that every cache will have no more or less than two ports, one to a P bus, the other to the M bus.

In addition to the 32 lines of the M bus, the system has a number of additional lines joining the system components. One set of lines is a star network, shown as lines 30 through 35 which connects each cache to the arbitor 27. Requests to take control of the M bus are first sent to the arbitor which decides which cache will control the M bus.

The virtual memory is contained on a disk which is shown in this figure as disk and controller 39. The fetch cycle starts with one processor 20 asking for the data contained in a virtual address. The associated cache 24 will either supply it or request it from memory 28, after translating the virtual address into a real address and supply the data to the cache if the data is in real memory, or will use the virtual address to fetch it from the disk's 39 virtual memory with the help of the map processor if necessary.

Figure 2A:
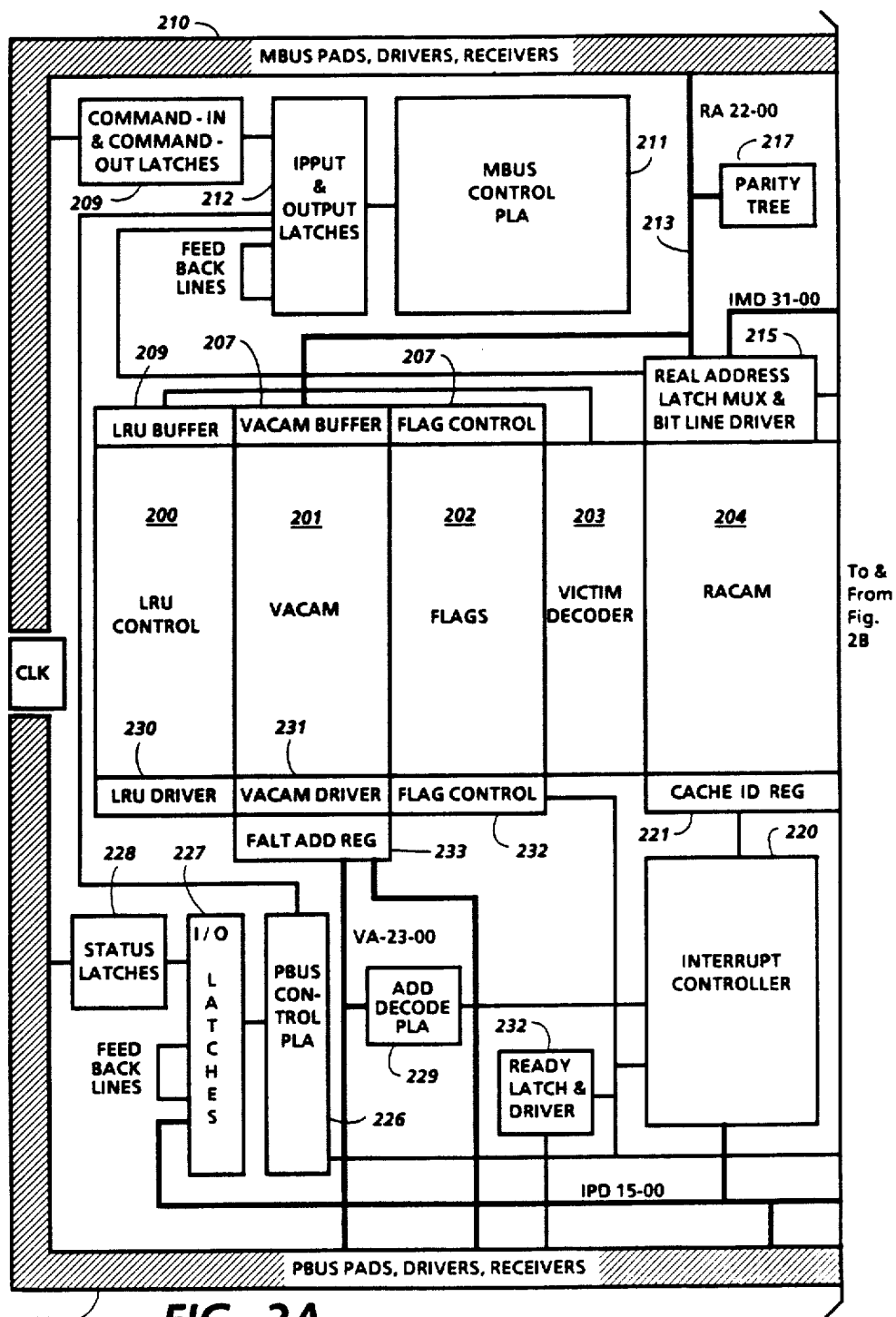
FIG. 2, comprising 2A and 2B is a block diagram of the logic in the Cache.
Figure 2B:
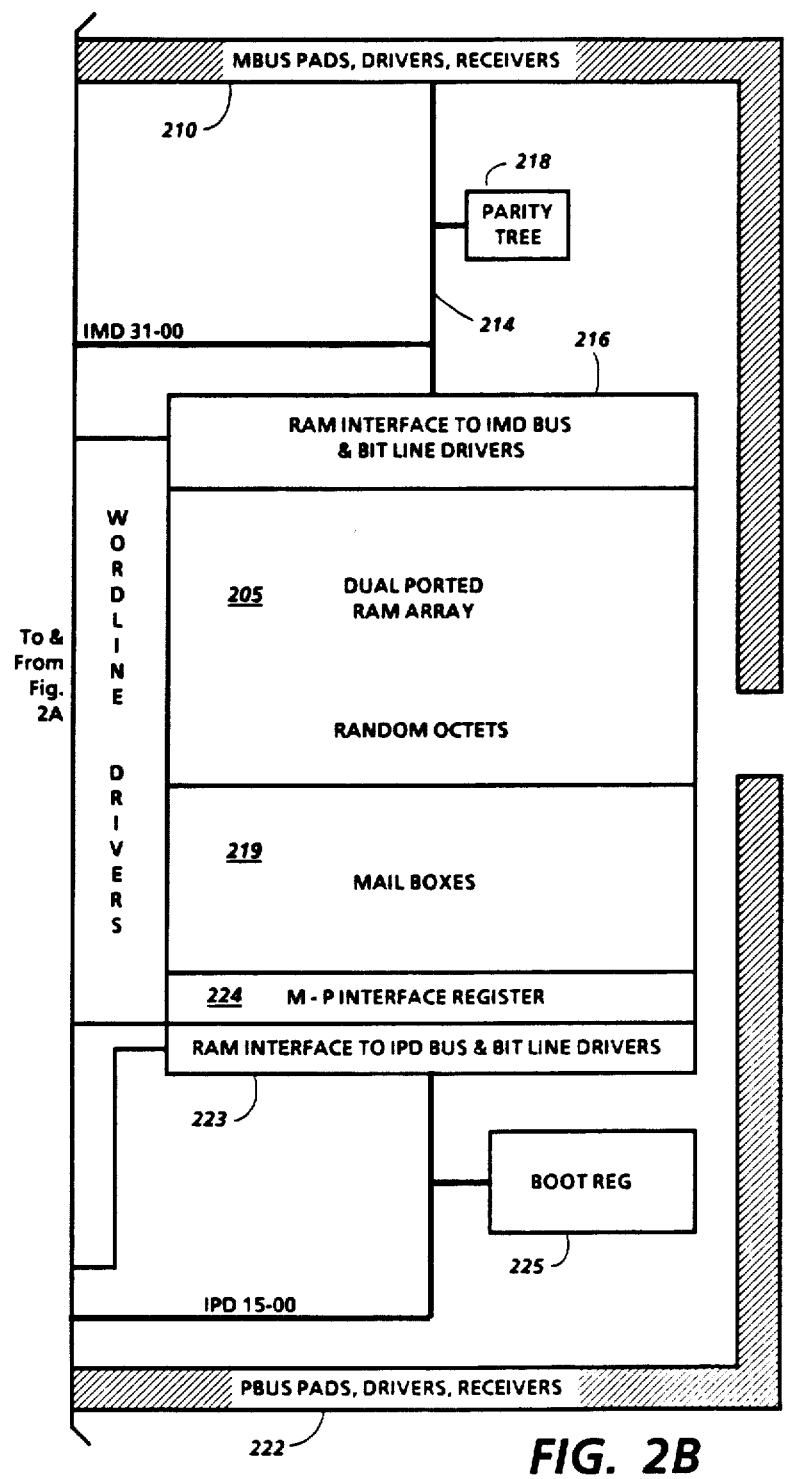

FIG. 2 is a detailed block diagram of the cache. The LRU least recently used control 200 is the circuit that determines which cell, of 16 in this described embodiment, to victimize. Associated with each cell is a content addressable virtual address field 201, a flag field 202, a content addressable real address field 204, and the data blocks 205, arranged into octets of 16 bit words. The victim decoder 203 is a set of logic and lines that takes the output of the LRU control 200 and selects the cell to victimize. This includes a decoder circuit to take the four bit LRU output and select one of 16 cells.

The flag control 206 selects flag status signals from the M bus and address information from the RACAM 204 and selects the actual flag bits in the flag field 202 to set or reset. The VACAM buffer 207 and the LRU buffer 208 are buffer drivers for selecting the control lines of the VACAM 201 and LRU 200 when looking for a match or for coupling out asserted line information.

The command block 209 receives command instructions from the M bus 210 and uses them as inputs to the state machine comprising PLA 211 and latches 212. The state machine goes through a plurality of states for each command, each output line thereof being used to control the various devices in the cache.

There are two data busses on the M bus side, the address bus 213 and the data bus 214. These are connected to the RACAM 204 and RAM 205 through latch, multiplexer and driver circuits 215 and 216. Parity circuits 217 and 218 automatically generate odd or even parity bits from the data or addresses and supply that one bit output to a parity line on the bus.

When mail is sent from one cache to another by the use of mailboxes, first the cache identification is established using the cache id stored in the register 221, and then the particular mailbox within the set of mailboxes 219 is specified. When the mailbox has received the information, then the associated interrupt controller 220 generates an interrupt to the processor over the P bus 222 to the processor informing it that there is mail. The mail boxes are connected to the P bus through buffer registers 224 and line drivers 223. The register 224 is also used to buffer outgoing mail since the processor puts out 16 bit words while the M bus is 32 bits.

A 32 bit memory 225 is available to be written into from the M bus. The contents are wired to various members of the cache to give it a personality, such as cache id 221, odd, even or no parity from parity devices 217, 218, or to allow the cache PLA 211 to handle data differently depending on the processor it is associated with, in case that is needed for particular caches as they react with the host system.

The P bus control PLA 226 processes commands received from the processor and is similar to the M bus PLA 211. It works in conjunction with latches 227 which controls its states, with latch 228 which latches commands in, and a decoder 229 which sends the command signals out to the circuits on the associated command lines. Under control of these lines are the LRU driver 230 which drives the command lines of the LRU CAM circuit, the VA CAM driver which activates the VACAM 201 lines, the flag control latches and decode logic 232, and the fault register 233 which stores fault virtual addresses from the M bus until the processor can service them.

Ready latch and driver 234 drives a line to the processor to hold up the processor in case of, for example, a miss on a virtual address. During this time the cache can run its data fetching process, which, of course is a variable amount of time, depending on where the data must be fetched from.

Figure 3:
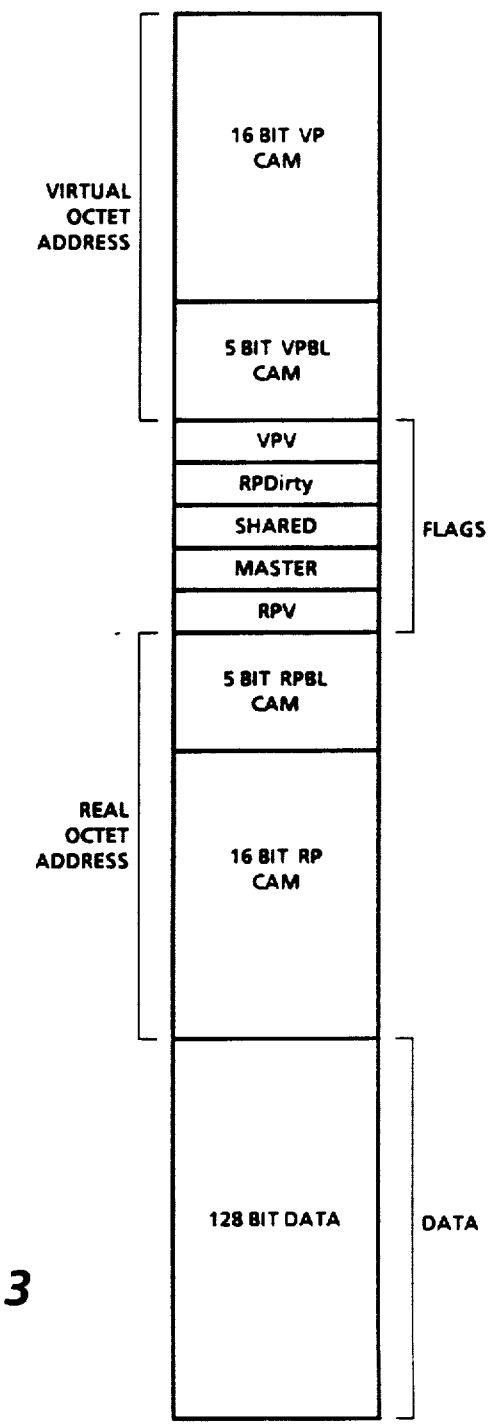
FIG. 3 is a more detailed block diagram of a Cache memory cell.
Figure 4A:
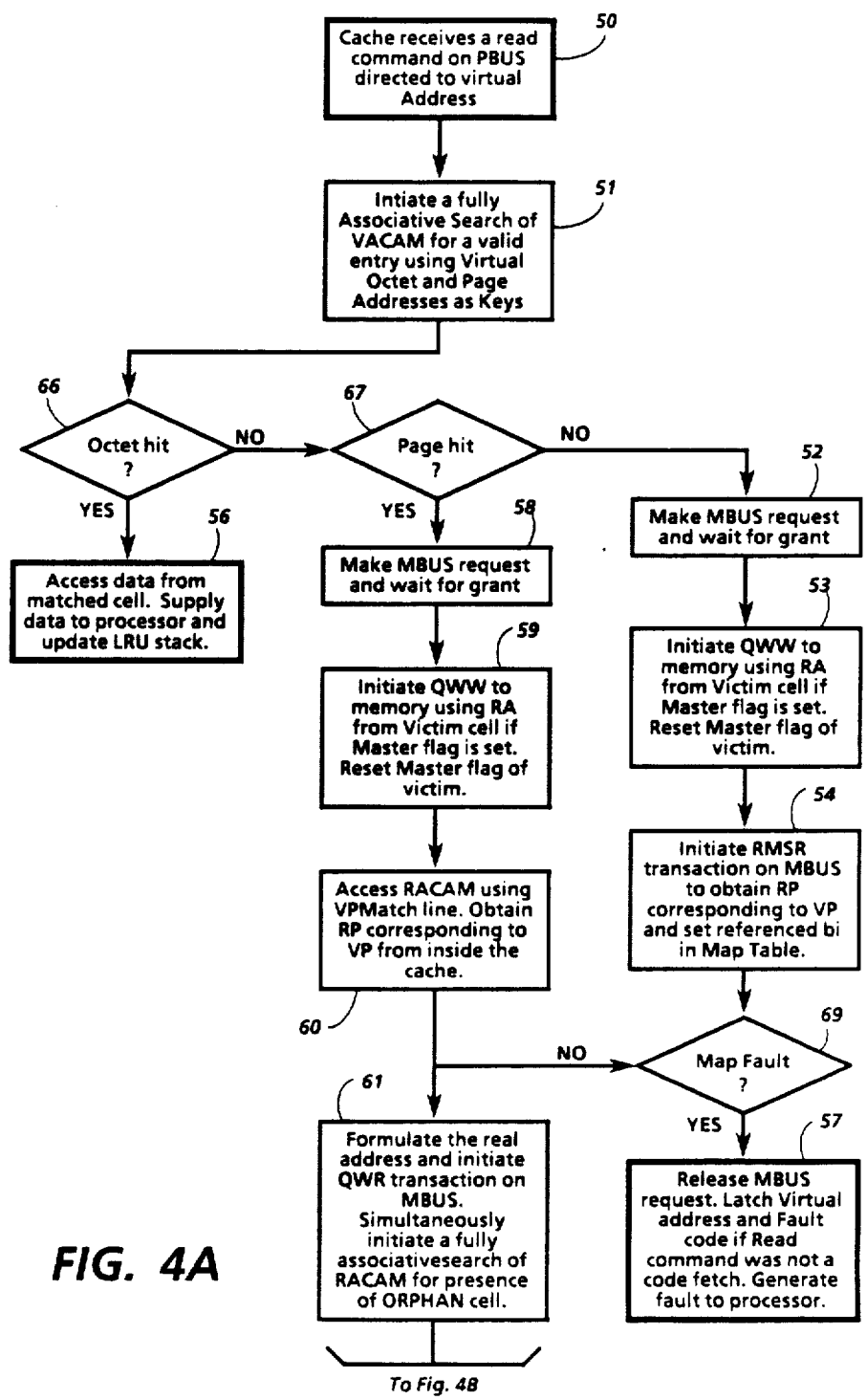
FIG. 4, comprising 4A and 4B is a flow chart of the process flow for a read command on the P bus.
Figure 4B:
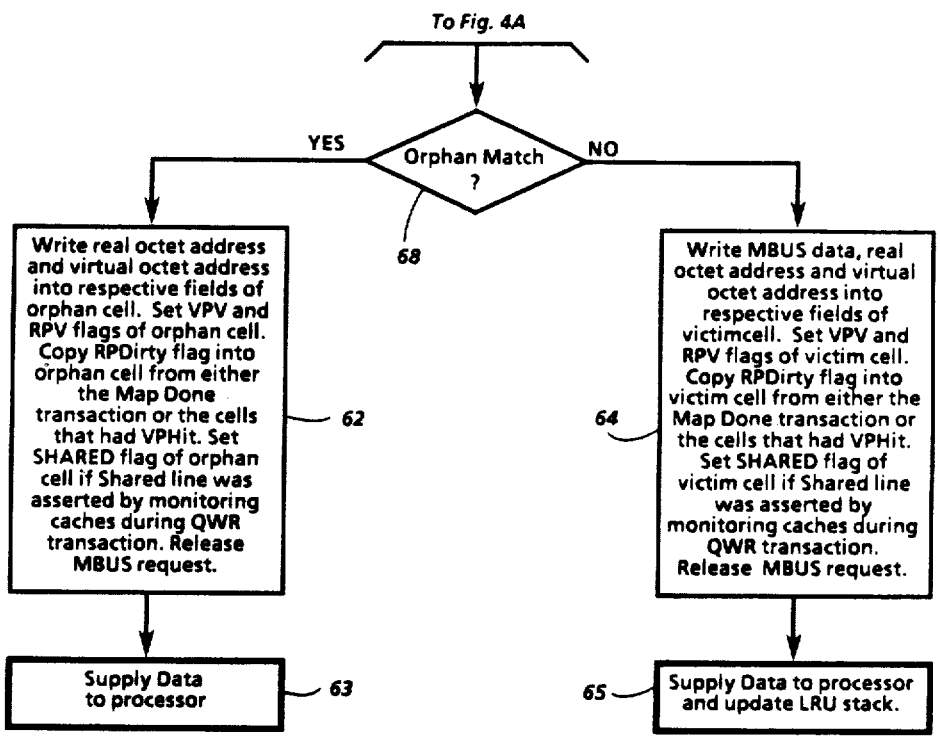

FIG. 3 is a detailed diagram of one cell and FIG. 4 is a flow chart of the process flow for a read command on the P bus.

Starting with FIG. 3, there is shown one cell which has the following fields; the sixteen bit virtual page field, the five bit virtual block field of the octet on the page, some flag bits, a sixteen bit real page field, a five bit real block field, and an octet of data. The VPV flag is the virtual page valid flag which indicates that the VACAM entry is valid and corresponds to the virtual address, the RPD real page dirty flag indicates that the page has been written into by some processor, the RPV real page valid flag which indicates that the RACAM entry is valid and corresponds to the real address, the shared flag which indicates that more than one cache has the octet, and the master flag which indicates that this cache is the one to write into the data field of this octet most recently. When this cell is addressed by either a real address or a virtual address, the rest of the cell contents become available for processing.

In FIG. 4, block 50, the process starts when the cache receives a read command on the P·bus for the data contained in a virtual address. Block 51 is an associated search of that virtual address in the virtual address CAM of the cache using the sixteen bit virtual page address as the most significant bits, and the five bit virtul octet address as the least significant bits. It is assumed without always being specified that simultaneoulsy, the octet is being addressed by a three bit address to specify the exact 16 bit word that the processor is trying to fetch. This is shown in FIG. 2 as the line between the processor 79 and the dual port RAM 75, which is the three bit octet address and the line for the virtual address which is sent to the fully associative virtual address CAM 72. If the entire address is found in the cache CAM 72, then the associated data from the dual port RAM 75 is sent to the processor as indicated at block 56. In addition, the LRU (least recently used) stack in the cache is updated. This is a circuit which keeps track of the order in which the words are accessed, so that if one octet must be swapped out, it will be the one least recently used.

The next possibility is that there is a hit on the page address but not on the octet. In this case the cache can get the real page address from the match on the virtual page address, and will use this knowledge as follows.

In this case the flow starts at block 58 where the cache must request control of the M bus from the arbitor and wait for the grant. In block 59, in order to make room for the data to be received, the cache must send the least recently used octet to the main memory using the real address of the victim cell, but only if the cell has been written into and therefore the master flag is set. If the master flag is not set, then there is an assumption that either the real memory data is equal to the cache data or another cache which has the master flag set for this octet will write the data into memory at a future time, and hence, no write is now necessary. The master flag is then reset if it was set to begin with.

Next, in block 60, the cache uses the virtual page address to get the real page address, thereby avoiding the use of the map processor.

In block 61, the real address of the octet is formulated by splicing the real page address to the virtual octet address and a read transaction is initiated. At the same time there is an associative search of the cache real address CAM for an orphan cell, to be described later. For the moment it will be defined as a cell of data with a valid entry in the real address CAM but an invalidentry in the virtual address CAM. The result of this is that the cache may have had the correct data and didn't know that it had it. As a result of this search, the flow will branch as will be discussed below.

Assuming no orphan match, the flow will continue at block 64 where the data, now available at the M bus, will be written into the cache. Also, the real and virtual octet addresses will be written into their respective fields of the cell, and the VPV and RPV flags can be set. The RP real page Dirty flag will also be copied into this victim cell, either from the Map Done transaction, or from the VPHit cell, whichever branch of the flow chart was taken to reach this point. The shared flag will be set if any other cache monitored the M bus, saw that the data involved in the Quad Word Read was also in its memory, and asserted the shared line. Finally, everything having been accomplished on the M bus, the M bus request will be released. Now that the data is in the cache, the data can be supplied to the processor, in block 65, and the Least recently used stack in the cache can be updated.

In the case where the page and octet address are both a miss, the flow goes to block 52, where the cache will make a request for the M bus and wait for the arbitor to make the grant. At block 53, the master flag is checked. If the master flag is set, the data in the victim cell was written into, and the data must be written, using a quad word write, into real memory to preserve the latest version. The master flag can them be reset. In this case the real address for the read operation must be obtained from the map processor. To get it, at block 54, a RMSR read map set reference transaction must be initiated on the M bus to obtain the real address corresponding to the virtual address requested, and to set the "referenced" flag in the map table of the map processor to indicate to the swapping routine, for later use, that the data has been accessed by at least one cache. The idea here is that if a page of data has been sent from virtual memory to real memory, and no one has accessed it yet, it should not be swapped out since the requesting cache has not had a chance yet to get around to accessing it. If it were swapped out, then when the accessing cache went to get that data, it wouldn't be there, and it would have to be accessed from virtual memory again, which would result in a certain amount of thrashing.

At this point, the data, which was not in the cache, may not be in real memory, in which case there will be generated a page fault indication. At block 57, the cache will release the M bus and generate a fault to the processor indicating to it that the data is not in real memory. At this point the data must be swapped from disk to real memory. The alternative is that the data which was not in cache may be in main memory, so that the flow will continue at block 61 as described earlier but using the real address from the map processor as a result of block 54.

If an orphan cell is found, then the flow continues at block 62, which is similar to block 64 except that the orphan cell is chosen instead of the victim cell, and the MBUS data is ignored. Finally, the data is supplied to the processor at block 63. How an orphan cell is created in the first place will be discussed later in this specification. At the moment it is defined as a cell where the VPV virtual page valid flag is set to zero and the RPV real page valid flag is set to one. After block 62 is completed, the orphan cell behaves as a normal cell. Also, the LRU stack is not updated to simplify the implementation.

Figure 5A:
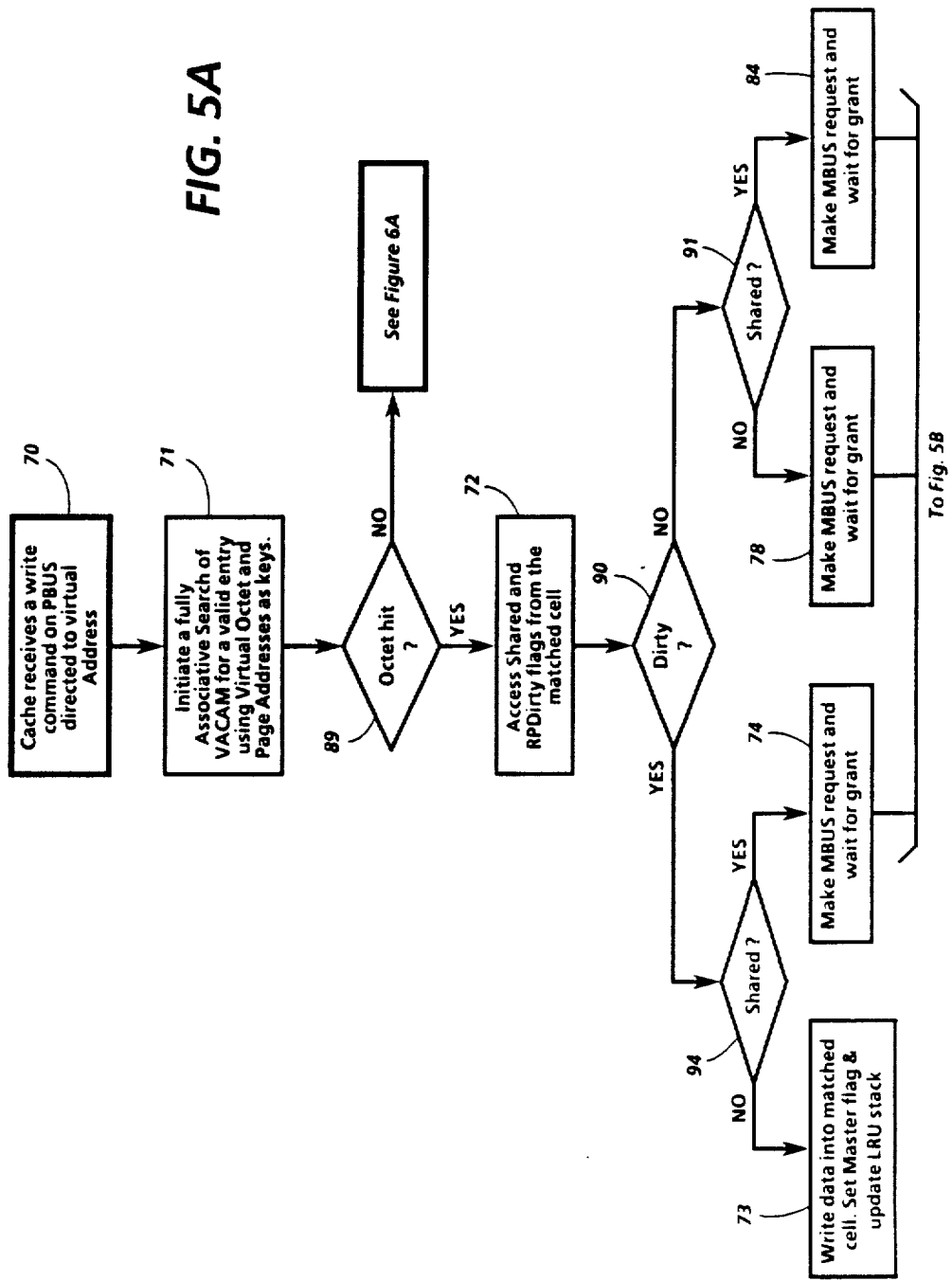
FIGS. 5, comprising 5A and 5B and 6, comprising 6A and 6B are flow charts of the write command process.
Figure 5B:
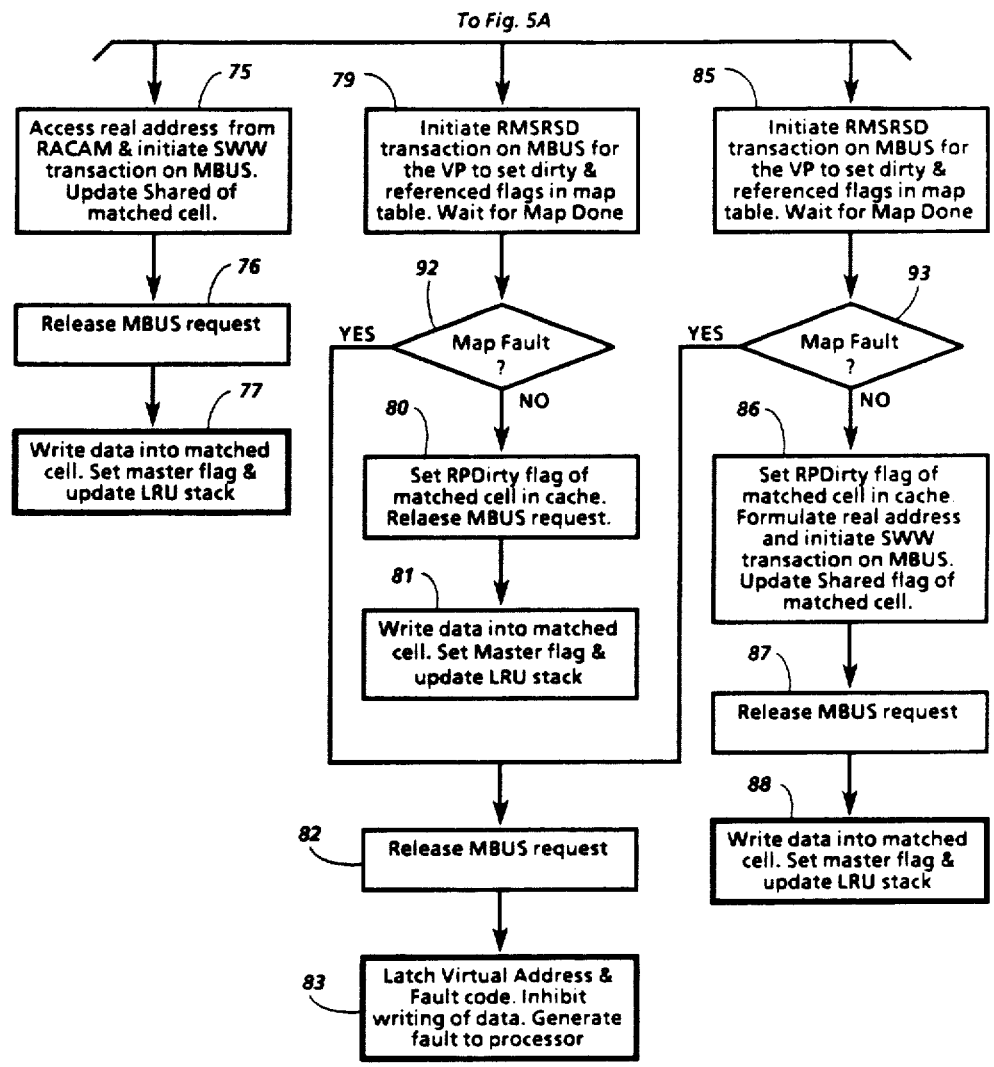

FIG. 5 is the process flow for a write command directed to a virtual address from the processor to the cache on the P bus.

The process starts at block 70 of FIG. 5 where the cache receives a write command to a virtual address from the processor on the P bus. At blcok 71, the cache does a fully associative search on the virtual address. Assuming that there was a hit, at block 72, the Real Page Dirty and Shared flags will be inspected, giving four possibilities. Note, the shared flag in a cache being set at this point means that the data was shared at some past time but may or may not still be shared. At block 73, it is found that the Page Dirty flag is set indicating that the data on this page had been written into already, but that the shared flag is not set, meaning that no other cache has the data. In this case these is no consistency problem, the data is written into, the master flag is set to show that this cache has written into it, and the LRU stack is updated to show that this peice of data is now the most recently used in this cache.

The next possibility is that the data is shared and the page has been written into. In this case, the data must be written into the other cache to maintain consistency, and this update is accomplished using the real address. In block 74 the cache requests control of the M bus and waits for the grant. In block 75, the cache gets from its own matched cell the real address and initiates a single word write to the real address of the cell with the shared data. A single word write is done here because the assumption is that only one of the words is being written into and therefore the entire quad word need not be transmitted. This single word write also resets the master flag in all other caches. The receiving cache will assert the shared line when it receives the data and then the transmitting cache will know that it is still shared. If no other cache picks up the data, then the shared line will remain deasserted indicating that the data is no longer shared, the transmitting cache will reset its own shared flag, and the next time around, the cache can use the easier and faster process of block 73. Having now updated the other caches, the cache then, at block 76, releases the M bus, at block 77 writes the data into its own cell, sets its own master flag to show that this cache is the last one to write into the data, and updates its own LRU stack to show that this data is the most recently used.

It can now be seen that there is only one cache with a master flag. This is convenient so that only one cache will respond when requests for the latest data are on the line, and therefore the electrical problems associated with multiple transmitters working into the same line can be avoided. The master flag has two functions, neither of which are essential to the working of the network, but which increase its efficiency. One is the situation where the data is shared and another cache requests it and all caches having the data could respond since the data in all caches is always kept consistent, but the system will operate more efficiently if only one cache transmits at a time. Identifying one cache as the master of the data allows the system to operate more smoothly. Also, the latest version must be written into memory after the last cache has used it. The system would work if each cache always wrote into memory when victimizing the data, but the number of transmissions can be minimized if only the master cache does so.

The next possibility considered by the flow chart is that the page is not dirty and octet is not shared. One factor that this loop must account for is that, as a software protection feature, some parts of the real memory are write protected, and if so, any write into the cell must be refused. Another factor is that if the data word is written into at the cache level, the map processor must know about it so that the real page in memory is written into the virtual page in disk during swapping. At block 78 the writing cache requests the M bus and waits for the grant. At block 79, a RMSRSD read map set reference set dirty command is initiated to set the referenced and dirty flags in the map processor to show that the data had been referenced by a cache and that it has also been written into. The response from the map processor may be a write protect fault. If not the cache sets its own RP Dirty flag at block 80, and releases the M bus. The purpose of the RPDirty flag being set is that this procedure need not be gone through the next time the data must be written into. In other words, the cache can go through the block 73 path instead of the block 78 path. Then at block 81, the data is written into the cell, the master flag is set, and the LRU stack is updated. If there was a write protect fault, there will be no write cycle, the M bus is released at block 82 and a fault signal at block 83 is sent to the processor to indicate that the cell is write protected.

The last possibility is where the page is not dirty, and octet is shared. Blocks 84 and 85 are identical to blocks 78 and 79. The remainder of this path not only performs the functions of the previous path but also must update the shared cell data. Specifically, at block 86, if there is no write protect, the RPDirty flag is set so that next time the block 74 path can be taken, a single word write is initiated using the real address of the data. The shared flag is updated as at block 75 and the M bus is released. At block 88, the cache updates its own data, sets the master flag and updates the LRU stack.

If there was a write protect fault, flow branches to block 82 where the M bus is released, and at block 83, a fault signal is sent to the processor.

Figure 6A:
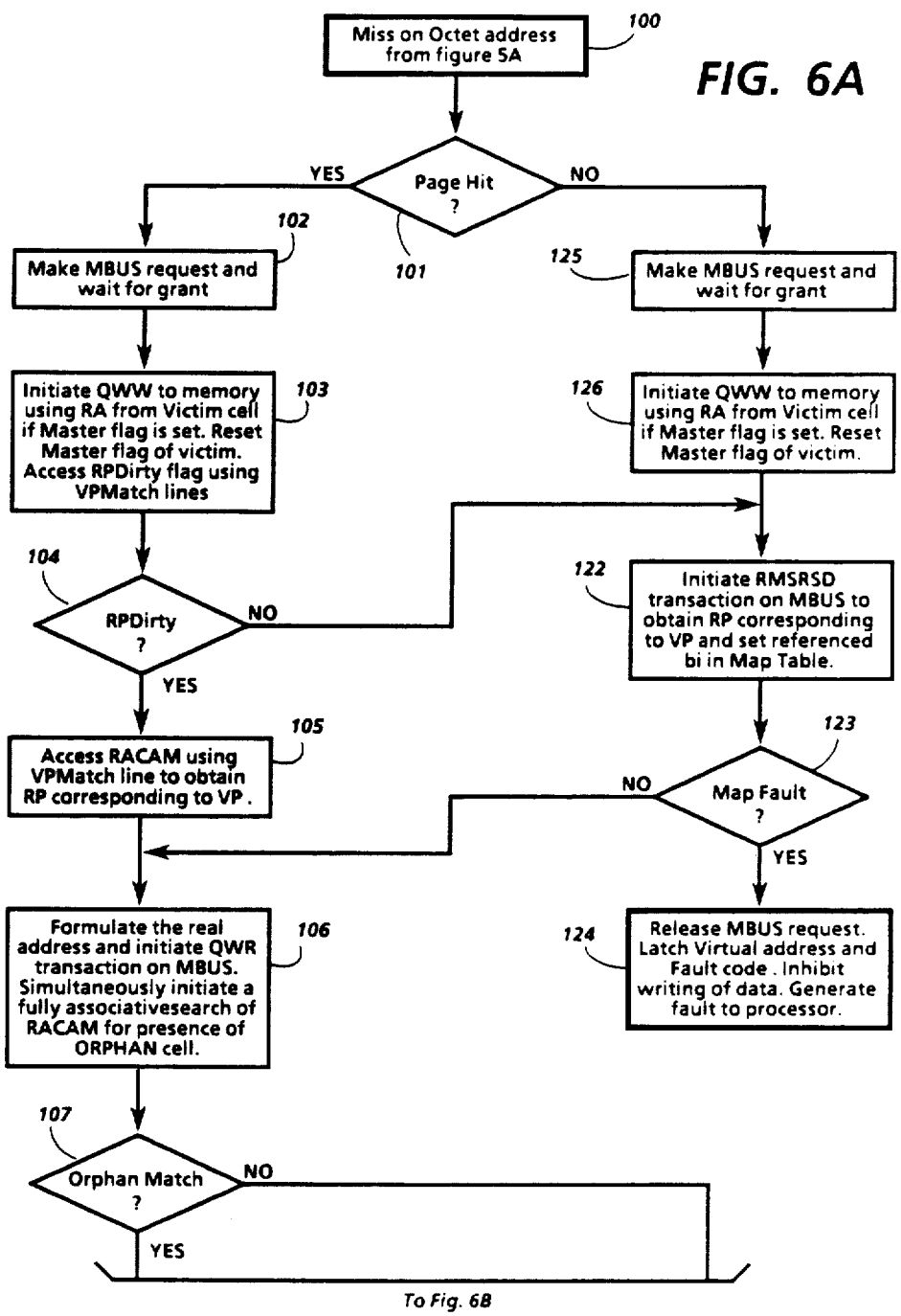
Figure 6B:
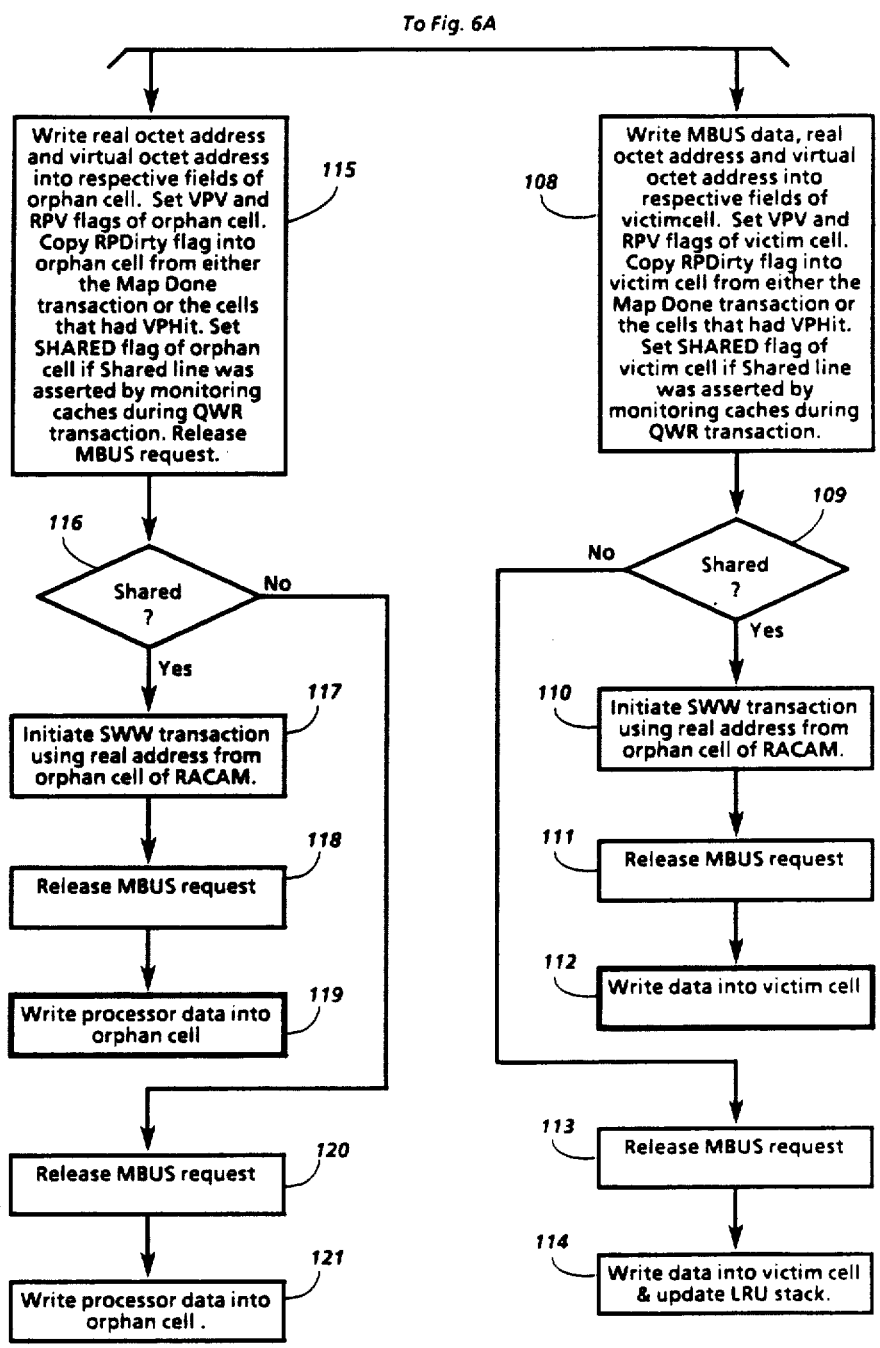

The flow charts continue on FIG. 6, block 100, where there is a miss on the octet. First the virtual cache CAM is tested at block 101 to see if it contains the same page address. If so, at block 102 the cache makes a request for the M bus and waits for the grant. Having received control of the M bus, at block 103 the cache makes room for the new data writing to real memory using the real memory address and data from the victim cell if the master flag is set, internally accesses the RPDirty flag and tests it at block 104. Assuming "yes", then the page has already been written into, meaning that it is not write protected and the cache will go ahead with the write. This is accomplished at block 106 by accessing the real page address corresponding to the virtual address at block 105, adding the octet address to it, and starting a quad work read to the cache memory on the M bus. The master flag is reset since the memory has been updated. At the same time look for an orphan cell.

At block 107 there is a test for an orphan match. Assuming there is none, at block 108 The real and virtual octet addresses are written into the cell, the real and virtual addresses are valid so the real and virtual page valid flags are set, the data is going to be written into so the master and real page dirty flage are set, the shared flag will be set if the shared line was asserted by another cache, and the M bus quad word is written into the cell. At block 109 the shared flag is tested. If it is shared data, the writing cache will have to update the other cache data before writing into its own cell by, at block 110, doing a single word write into the other cache using the real address, at block 111 releasing the M bus, and at 112 writing into its own cell. If the data was not shared then no other cache will have to be updated, at block 113 ther M bus will be released, and at block 114 the data is written into the cell and LRU is updated.

At block 107, if there was an orphan match, that means that the data is already in the cache memory. Therefore the orphan cell, rather than the victim cell, will be used. At block 115 all of the functions of block 108 are performed except that the data on the M bus is not loaded. At block 116 the shared flag is tested, and the steps at blocks 117 through 121 are performed exactly as those of blocks 110 through 114.

At block 104 there is the alternative that the real page has not been written into. Then at block 122 a read map set reference set dirty transaction over the M bus to the map processor gets the real page address and sets the flags in the map table. At block 123 the write protect for that page is tested. If there is a write protect the process continues at block 124 where the M bus is released and a fault signal is sent to the processor. If there is no write protect the process continues at block 106 as before.

At block 101, if there was no page hit, then at block 125 the cache will make an M bus request and wait, at 126 the cache will write an octet from its victim cell into real memory using the real address, but only if the master flag is set, and then continue as before at block 122. The flow charts continue with FIG. 7 which describes the processes at the M bus port of the cache, as opposed to the P bus transactions that have already been discussed. In other words, these are reactions on the part of a passive cache in reaction to data transmissions initiated at some other cache in the system.

Figure 7:
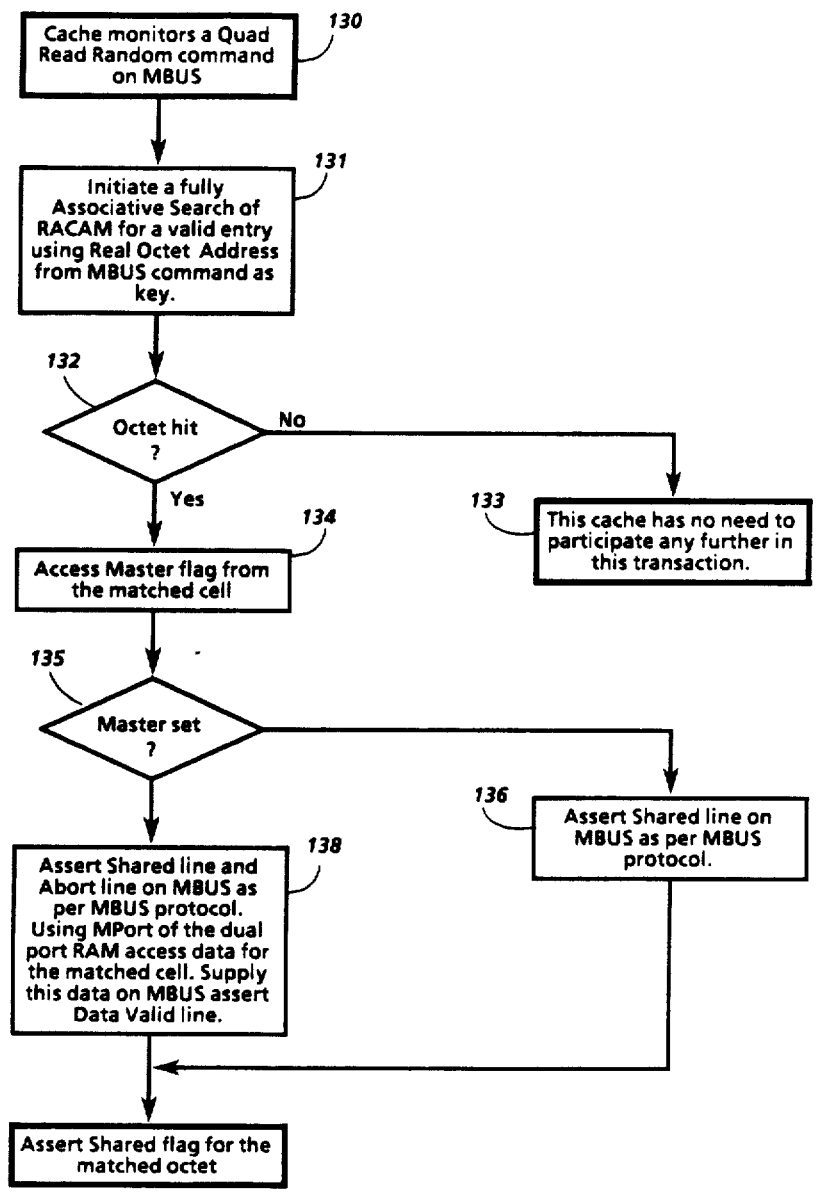
FIG. 7 is a flow chart of the quad read process.

As shown in FIG. 7, the reaction to a quad read command starts at block 130 with the cache seeing a quad word read command on the M bus. At block 131 the cache will make a search of its real addresses to see if it has the data. If there is no hit at block 132 the cache ignores the transaction as shown at block 133. If there is a hit, the cache must see who the master of the data is at block 134. If the monitoring cache decides at block 135 that it is not the master, then at block 136 it need only assert the shared line to indicate to the rest of the system that this data is shared. In case the monitoring cache is the master, then it will have the responsibility to suppply the data. This is done at block 137 by asserting the shared line, to let the other cache know that the data is or will be shared, and to assert the abort line which lets the memory know that a cache will be supplying the data. Then the monitoring cache, which is the master, will transmit the data to the M bus, and at the same time assert the data valid line to let the other caches know that the data on the line at the moment is valid, so they can acquire it. This is necessary since in some cases the data transmission will be accomplished after one or several extra clock periods, during which time the status of the lines will not be valid. Finally the monitoring cache must set its own shared flag at block 138.

Figure 8:
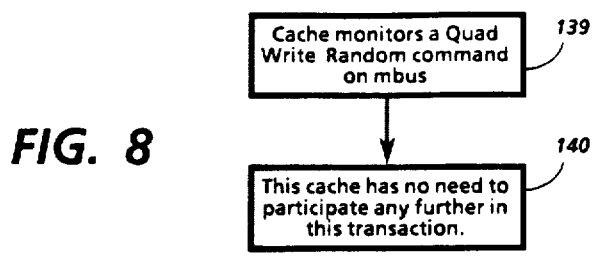
FIG. 8 is a flow chart of the quad write process.
Figure 9:
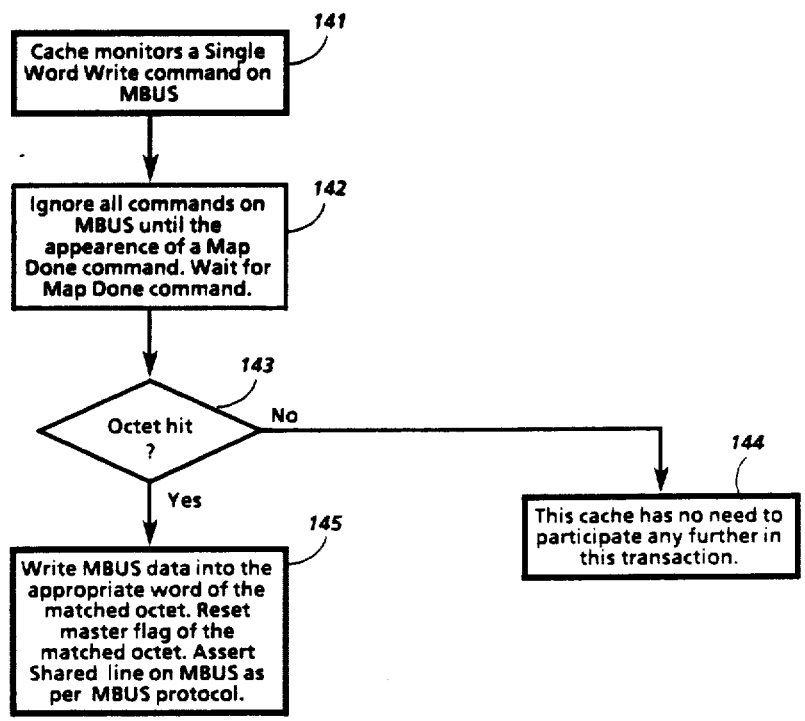
FIG. 9 is a flow chart of the single word write process.

FIG. 8 is the case where a monitoring cache detects on the M bus that another cache is writing a quad word to memory, as shown at block 139. The other cache can do this only if it is the master. therefore the monitoring cache has nothing to do as shown at block 140, Either the monitoring cache already has the data, in which case it must be the latest version and need do nothing, or it does not have the data, in which case no action is required. In this case the shared flag is not reset because there may still be other copies of the data in the system. FIG. 9 is the process for the monitoring of a single word write, which must have originated from a cache that knew the data was shared. At block 141 the cache monitors the M bus, and searches for the data at block 142. If there is no hit at block 143, then nothing needs to be done at block 144. If, however, there was a hit, then the monitoring cache must, at block 145, write the data into the appropriate location, reset the master flag in the cell to show that another cache wrote into it last, and assert the shared line to inform the initiating cache that the octet is still shared. According to this process, a shared flag may be set in a cache even though the data is no longer shared. That is, the data that was previously shared was victimized in a cache. In that case, it could happen that the initiating cache is the only cache with the data. Then, since the shared flag is still set, the cache would do a single word write to the M bus. However, after the first write, no other cache would assert the shared line, and the cache would then know that the data was no longer shared, and would no longer write data to the M bus when making changes to the local copy of the data.

Figures 10, 11:
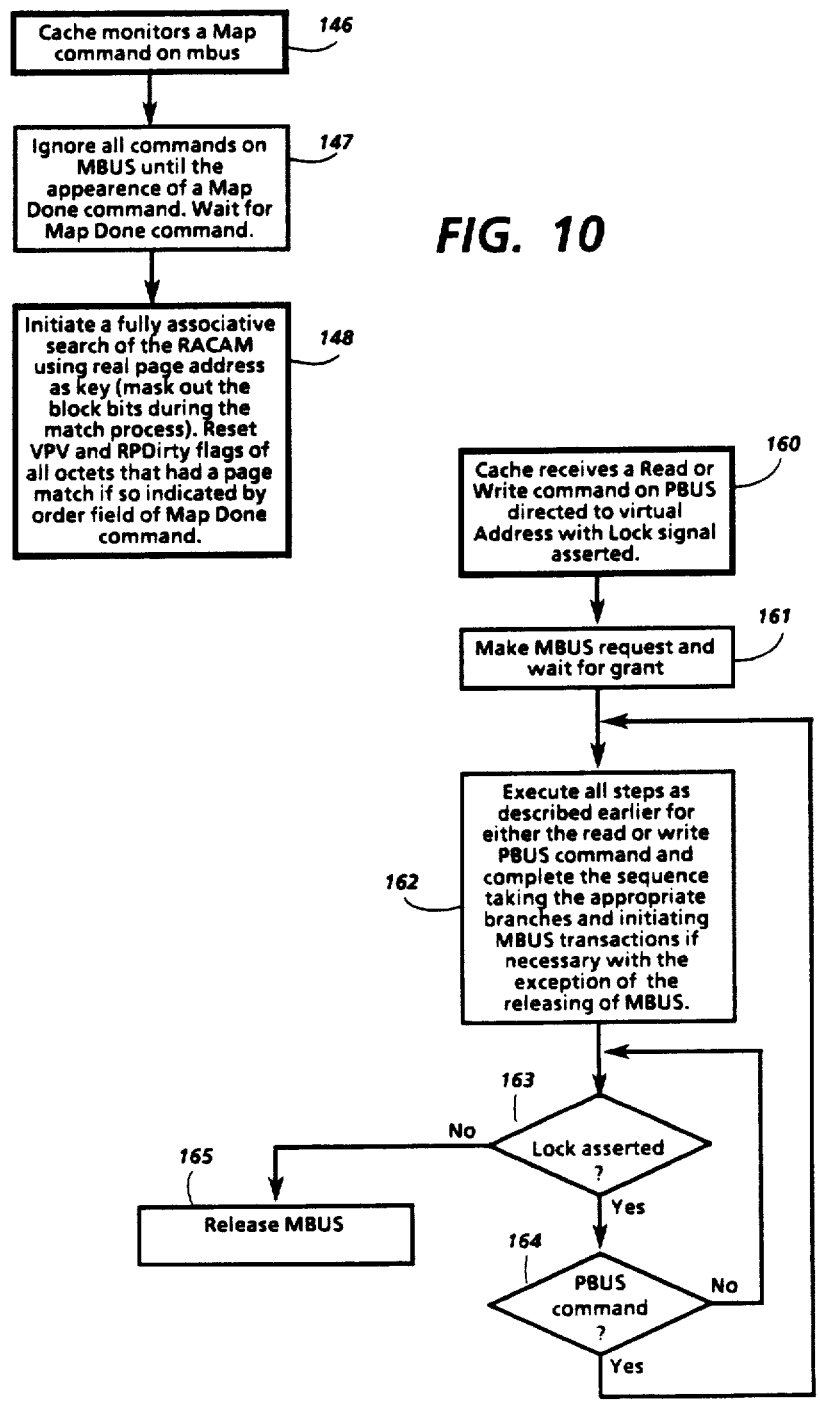
FIG. 10 is a flow chart of the map command process.
FIG. 11 is a flow chart of the lock-out feature used during some write commands.

FIG. 10 is the flow for monitoring a map command on the M bus, the possible map commands being read map, write map, read map set reference, read map set reference set dirty and write map flags. Any one of those use the same process of FIG. 10. At block 146 the cache monitors the map command on the M bus. This would be a map command from another cache to the map processor. At block 147 all other commands are ignored until the map done command is received. At this point, block 148, the cache will search for the real page address, and for every octet found (there may be several in the cache from the subject page), reset the virtual page valid and real page dirty flags if so indicated by the order field in the done command. This monitoring process potentially creates "orphan cells " whenever the map table is changed to break the correspondence between a virtual page and a real page so that all the cached copies of the map table are also modified and kept consistent. This monitoring process also keeps the cached copies of map table consistent when the map table is changed to write protect a page.

The term "orphan cell" has been referred to in the flow charts. This term describes a cell where the real address is valid for the data octet, but the virtual address is invalid. The result is that when the processor asks for an octet, and does so by specifying a virtual address, the data may be there in the cache, but the cache will now know it. As described in the preceding paragraph orphan cells may be created whenever map tables are manipulated during the process of swapping data between real and virtual memories. It is necessary to create orphan cells since the latest copy of data may be inside a cache and not in main memory and is written into memory only at some later time when that octet is victimized by the cache. In the intervening period between creation of orphan cell and victimization that data is only accessible from MPort side of the cache using its real address. In this system since the disk also communicates with the real memory through its own cache and M bus, the process of swapping a page of data between the disk and real memory, proceeds correctly due to the implementation of the consistency algorithm as described before.

An additional problem in maintaining data consistency is that two caches having shared data may try to read the subject data into the processor, modify it, and write it back into the cache at the same time. The problem is that, for some critical pieces of data, it is important that only one processor, amongst the plurality of processors, be allowed to execute this sequence at a given time. A processor may opt to guarantee this by locking out the M bus for the duration of the read-modify-write process. This prevents any other cache from modifying the critcal piece of data since that cache must update all copies before updating its own. This is shown in FIG. 11.

Figure 12:
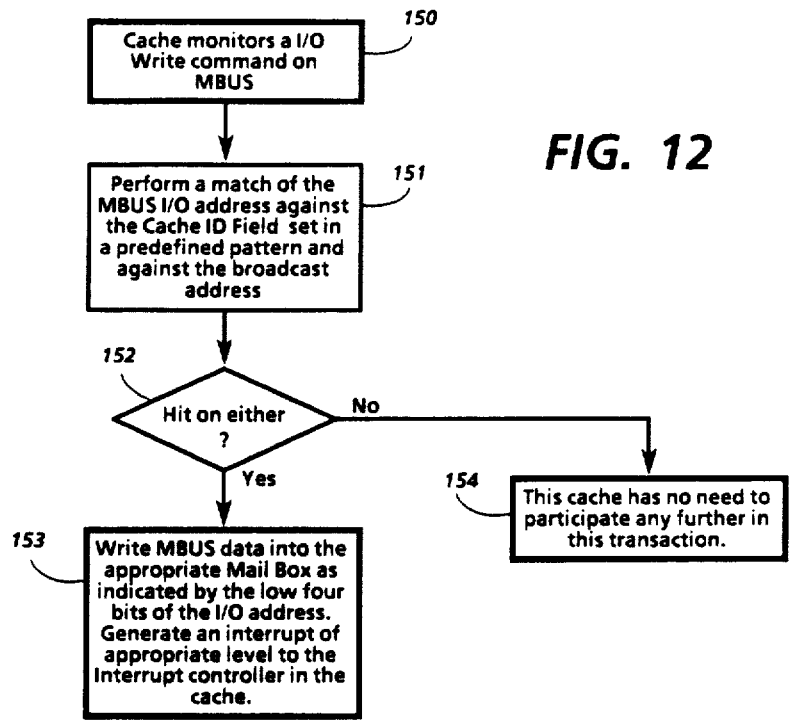
FIG. 12 is a flow chart of the process for monitoring an I/O write.

Another feature of this invention is the ability of one cache to be able to transmit data to another specific cache by specifying its "mailbox" address. In FIG. 12, block 150, there is shown the process flow for a cache monitoring an I/O write command. When the monitoring cache recieves the address it matches it against its own mailbox address, at block 151. A broadcast address (in this embodiment, all zeros) is one that is addressed to all caches. In either case, at block 152, the process will be directed to continue at block 153 where the receiving cache will write the data from the M bus into one of sixteen mailbox slots in the cache, depending on the lower four bits of the address. There will then be generated an interrupt to the processor using the same four bits to inform it that it has just received mail, and where the data is stored. If the write command was not a broadcast command, nor was addressed to the monitoring cache, at block 154, the cache need do nothing.

Figure 13:
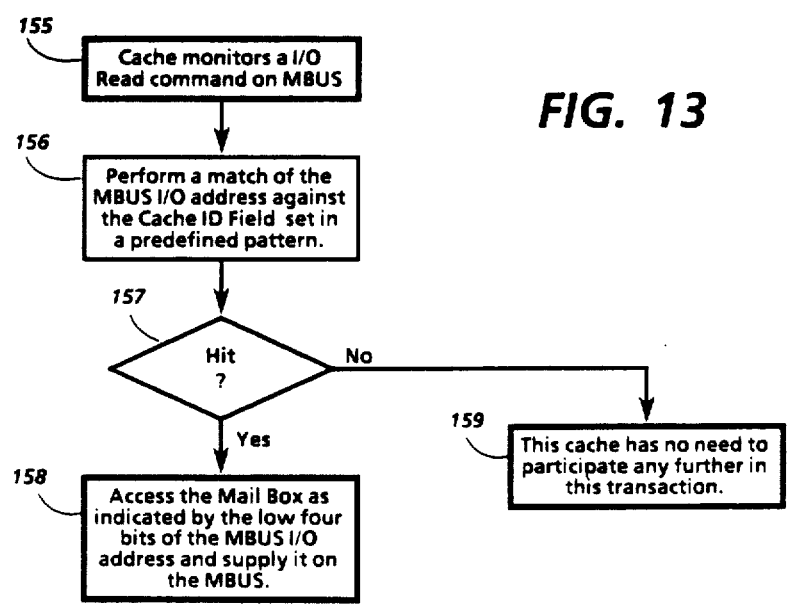
FIG. 13 is a flow chart of the process for monitoring an I/O read.

The dual of the I/O write precess is the I/O Read process of FIG. 13. This is where a monitoring cache receives a message on the M bus that another cache is trying to read from a particular cache. This is most usually the case where a certain cache has been set up as a system resource, and other caches read certain kinds of data, like timing information, from it. At FIG. 13, block 155 the monitoring cache receives a read command from the M bus. At block 156 a match is made against the mailbox address. If there is a match at block 157 the process continues at block 158 where the requested data is transmitted onto the M bus. If there was no match at block 157, there is nothing more to be done, as shown at block 159. The MBUS is a high performance, synchronous, 32 bit multiplexed address and data bus used to interconnect a multiprocessor system. Connection of a processor to the Mbus is through a cache (FIG. 1). The Mbus also connects to a memory through some form of memory controller. A map processor is provided to communicate the current virtual to real page mapping information to the caches. The map processor and memory controller may be designed as one unit. In addition, one or the other may contain other system features. Although this document frequently refers to caches, it does not preclude the connection of other devices on the Mbus so long as they obey the bus protocol and participate in the data sharing, if need be. Finally, an arbiter exists to perform the arbitration between the requesters of the Mbus and to insure that only one is the *grantee* of the bus at any given time.

Once a device is the grantee of the bus, it will initiate a bus transaction which may require a second device (known as the slave) to respond. All transactions start with an address cycle during which time a command defining the transaction and an address are put on the bus. All remaining devices on the bus must monitor this command to determine if they are to respond in a purely passive mode or as a slave. When a device responds as a slave, protocol dictates when it has control of the bus. The format of the disclosed embodiment limits real addresses to 28 bits. This allows addressing up to 228 32 bit words (1 gigabyte) of real memory.

The remainder of this document uses the following conventions:

1. Signals have a positive true value unless the second character of the signal name is an "n".

2. The least significant bit is the rightmost bit and is numbered bit 0. The most significant bit is the leftmost bit and for a bus with n bits, the most significant bit is numbered bit n−1. Clocking for the Mbus consists of a single phase clock with a duty cycle that is one third high and two thirds low. One cycle on the Mbus consists of one complete clock cycle. All timing is with respect to this signal. Other clock signals may be derived from this, as needed. The timing of this clock is used to control the time during which devices drive the bus. Unless otherwise indicated, all Mbus signals are actively driven only during the low period of the clock and tri-stated during the high period of the clock. At the receiving end, all signals are sampled on the rising edge of the clock. This timing assures a hold time at the receiving end and that there is no bus connection between different drivers.

All devices must be able to drive signals on the bus to which they are connected either high or low except for MnError and MnHousekeepingInProgress. These two signals may only be driven to the low state. Some signals have a pull-up resistor to Vcc which is meant to overcome leakage currents and maintain a high value during cycles when those signals are not driven.

The following is a description of signals having separate lines on the M bus.

Reset

A common signal to all devices which when active shall cause all devices to be reset and come to a predictable state. Unless otherwise specified, while Reset is active all signals shall be in a tri-state condition, regardless of the state of the clock. This is especially important during power-on sequences when initially the clock is not operating and high current contention on the bus must be prevented. During power-on, Reset must track Vcc as closely as possible. Reset changes synchronous to the rising edge of Clock. Once activated, Reset must remain active for a minimum of 20 clock cycles or 2 microseconds, whichever is greater. In addition, while Reset is active some lines may be used for initializing various devices.

This line must be driven to one state or the other at all times.

MnRqst

A line from a device to the arbiter which, when asserted, means that device is requesting the Mbus. When a device is ready to give up the bus, MnRqst is de-asserted during the second cycle before it relinquishes the bus. MnRqst is never asserted low, then returned back to the high state without first receiving MnGrant, unless a Reset is received. Reset forces the device to drive this line high with a source capable of supplying approximately 100 ua. A standard TTL driver can be connected at this time to drive the signal low for board test purposes. This signal is continuously driven during the entire clock cycle; it requires no pull-up. There is one MnRqst line from every device on the bus that can be a grantee.

MnGrant

A line from the arbiter to the requesting device which, when asserted, grants control of the bus to that device. MnGrant cannot be asserted to a device that does not have MnRqst asserted. The earliest MnGrant can be asserted is one cycle after MnRqst is asserted. The new grantee will take control of the Mbus on the cycle following the receipt of mnGrant. MnGrant must go high one cycle after MnRqst goes high. Only one MnGrant line can be active at any one time. There is no pull-up on this line.

MnGrantee4-0

A common 5 bit bus which contains a binary encoded value of the current active MnGrant line. These five lines have the same timing as MnGrant. When there is no currently active MnGrant line then the binary value of these five lines may be anything. However, these lines must not float and are therefore actively driven at all times. There are no pull-ups on these lines.

MNoGrant

A single line from the arbiter which, when asserted, indicates that there is currently no active MnGrant.

MnNewRq

A common line which, when asserted, indicates to the arbiter that the current grantee wants to retain his grant, but is willing to relinquish it if there are other requesters at this time. This line is logically unnecessary, but can be used by a device to reduce latency in re-acquiring the Mbus when it would otherwise be idle. Therefore, not all devices are required to connect to this line.

When a device wishes to signal that it wants to retain its grant but is willing to relinquish it, it asserts MnNewRq for exactly one cycle beginning two cycles before it is willing to give up the bus (This is the same point at which MnRqst would have been de-asserted if this line was not being used). MnRqst must remain asserted during this time. If the arbiter assigns a new grantee, MnGrant will be de-asserted on the cycle after MnNewRq was asserted, and the device that asserted MnNewRq will release the bus at the end of that cycle. If, however, MnGrant is not de-asserted on the cycle after MnNewRq was asserted, then the bus is retained by that device.

This line requires a small resistor pull-up to Vcc. During Reset, this line is in tristate.

McAdCycle

A common line which, when asserted, signifies the beginning of an Mbus transaction. During this time the four most significant bits of the Mdata bus (Mdata3-1-Mdata 28) contain a valid Mbus command and the remaining 28 Mdata lines (plus the four MAdrExtend lines in the wide format) contain an address. This is known as an address cycle. All devices on the Mbus must monitor this line at all times (except when Reset is active) to determine when an Mbus transaction is beginning, and then determine from the command and the address whether or not it must participate in the transaction. MnAdCycle cannot be active for more than one cycle at a time, and since the minimum transaction is two cycles, the minimum time until MnAdCycle can be asserted a second time is two cycles (thus, the maximum rate that MnAdCycle can occur is every other cycle).

This line requires a small resistor pull-up to Vcc. During Reset, this line is in tristate.

MnShared

A common line which has a dual purpose. The first purpose is to indicate that data is shared. During a ReadQuadRandom or WriteSingle, the grantee drives this line high on the cycle following address cycle. During the second cycle after address cycle, any cache which has a match on the address will pull this line low, indicating that the data is shared. If the data is not shared, this line will float (with a small pull-up) in the high state.

The second purpose is to indicate alternate data ordering during a ReadQuadRandom or a ReadQuadStream operation. If the supplier of the data drives this line high during the first valid data word, then the data is being supplied in the requested order. If it is driven low, then the alternate order is in effect.

This line requires a small resistor pull-up to Vcc. During Reset, this line is in tristate.

MnAbort

A common line with a dual purpose. The first is to indicate to the memory during a ReadQuadRandom or a ReadQuadStream that a cache has the most recent version of the data and will supply it. MnAbort is driven high on the cycle following address cycle by the grantee, and pulled low on the following cycle by the device that will supply the data. If no device is supplying the data, it will float in the high state (with a small pull-up) indicating that the memory must supply the data.

The second purpose is to indicate a quadword transfer to nonexistent real memory. In this case if MnAbort is asserted at the same time as MnDV it will terminate the operation and the initiating device will interpret it as a fault. The initiating device then takes whatever action is appropriate for it.

This line requires a small resistor pull-up to Vcc. During Reset, this line is in tristate.

MnDV

This is a common line to all devices. During WriteQuadRandoms and WriteQuadStreams it indicates how many wait states to append after the write before releasing the bus. This line should be asserted on the second cycle after address cycle for zero waits after the write. If it is not, then for every cycle it is delayed, one wait cycle is appended by the grantee after the write. This allows the memory time to catch-up.

During ReadQuadRandoms and ReadQuadStreams it indicates the beginning of a quadword transfer. When MnDV is asserted, the first word of the quadword is on the Mbus. MnDV need not be asserted during the remaining three words of the transfer. The earliest it can be asserted is during the third cycle after address cycle.

Finally, this signal is used during an I/O Read (fast) to indicate whether or not valid data was returned by a slave. If it is asserted during the third cycle after the address cycle, then valid data was returned by the slave.

This line requires a small resistor pull-up to Vcc. During Reset, this line is in tristate.

MnError

A common line used to indicate that a parity error was detected on the Mbus. If parity detection is enabled, then when any device on the bus detects a parity error it will pull this line low and hold it low until Reset is asserted. In addition, all devices on the bus must continuously monitor this signal and tristate all Mbus signals (except MnError) if it goes active. If parity detection is disabled, then all devices will ignore this line. It may, however, still be driven active for one cycle at a time by a device detecting a parity error. This line must be pulled up to Vcc by an external resistor of between 820 ohms and 2k ohms. Devices on the bus can only pull this line low and must be capable of continuously sinking 7 ma. in the low state. This signal is guaranted to make the transition from inactive to active with the same timing and set-up as all other signals, however, the transition back to inactive is done by the pull-up and will be slow and may undergo an unknown value. This should not be a problem, though, since when parity checking is enabled this line should only go active once and stay active. When parity is disabled, all devices should be ignoring this line. During Reset, this line is in tristate.

MHold

This signal is provided on the back panel for debug purposes. Currently, its use is not defined.

Mdata31-00

A common bus used to carry address, data, and command. Whenever MnAdCycle is active, these lines contain the four bit command code on Mdata31 to Mdata28 and the low 28 bits of address on Mdata27 to Mdata00 (in the narrow bus format, this makes up the entire address). Then, depending on the transaction, they contain the data at various times as defined by the protocol. At all other times, the bus is driven with meaningless data to prevent it from floating to an undefined value. This is the responsibility of the device that currently has control of the bus. If no device has control, then responsibility falls upon whatever device has been assigned this function in the system. During Reset, these lines are in tristate. These lines have no pull-ups.

MAdrExtend3-0

A common 4 bit bus used in the wide format to carry the four most significant address bits (address bits 31 to 28). These four address bits are valid only when MnAdCycle is active. At all other times, the bus is driven with meaningless data to prevent it from floating up to an undefined value. This is the responsibility of whomever currently has control of the bus. If no device has control, then responsibility falls upon whatever device has been assigned this function in the system. During Reset, these lines are in tristate. These lines may have pull-ups or pull-downs to supply a default value for devices that are operating in the narrow format, if present.

MParity

This is a common line which maintains a single bit parity across the Mdata and MAdrExtend buses. All devices should be able to select either even or odd parity generation. Parity is driven on this line one cycle after the data/address/command for which it is intended. This line must contain correct parity for all address and data cycles, but not necessarily for any others. The one exception is wait states inserted during a quadword read. The period of time starting with the third cycle after address cycle of a quadword read until the first valid data word is delivered must also have valid parity (Note: it is only necessary to generate correct parity here; there is no requirement to test it).

Since there are two formats defined for the bus, parity generation depends on which one is in force. When the wide format is in use, parity is generated across Mdata31-Mdata00 and MAdrExtend3-MAdrExtend0. When the narrow format is in use, parity is generated across Mdata31-Mdata00 only. In a system with both wide and narrow format devices, parity can be maintained by the wide format devices as long as the MAdrExtend bus has an even number of bits set. During Reset, this line is in tristate. This line has no pull-up.

MnHousekeepingInProgress

A common line which is pulled low by any device that is busy doing housekeeping. When all devices have finished, this line will return to the high state by virtue of the pull-up resistor.

This line must be pulled up to Vcc by an external resistor in the range of 820 ohms to 2k ohms and must be capable of continuously sinking 7 ma. in the low state (820 ohms and 280 pf gives about 230 ns to reach the 3 volt level). Devices on the bus can only pull this line low. Devices pulling it low will hold it low during the full clock cycle. Since this line is pulled from the low to high state by a pull-up resistor, it may undergo an undefined value during the sampling period. Therefore, all devices to which this is an input must be able to resolve this asynchronous transition. During Reset, this line is in tristate.

The following is a description of Mbus Transactions

Transactions are always initiated by the grantee and always begin with an address cycle. A device does not have to initiate a transaction immediately upon receipt of MnGrant, but may insert wait cycles until it is ready. Wait cycles are inserted by simply not initiating the address cycle. In a like fashion, wait cycles can be inserted between transactions initiated by a grantee when it requires extra time to process the data from the previous transaction. Such wait cycles should be kept to a minimum since they cause bus degradation and increase latency.

Transactions consist of a minimum of two cycles on the bus. Some are a fixed number of cycles in length. Others are variable and depend on a response from a slave to signal the end of the transaction. The following transactions are defined:

WriteQuadRandom

WriteQuadStream

Four 32 bit words are written from the grantee to memory. The two LSB's of the address are always zero and, therefore, the ordering of the LSB's of the address for the data written will always be 00, 01, 10, 11. The receiver of the data must immediately accept all four words. The memory, however, may insert wait states after receiving all four words by holding MnDV high until three clocks before it is ready. The memory is the only device which can assert MnDV in response to these commands.

WriteQuadRandom and WriteQuadStream behave identically on the Mbus and differ only in their interpretation by other devices on the bus. WriteQuadStream is used when new data is being introduced into the memory system from some outside source, such as an I/O device. As such, the data must be captured by all devices on the bus that match on the address. A WriteQuadRandom, however, is used to write the most up to date version of data back to memory when it must be flushed out of a device, and whose consistency has been maintained in all devices (except memory) by the consistency algorithm. WriteQuadRandoms can, therefore, be ignored by all other devices on the bus.

ReadQuadRandom

ReadQuadStream

Four 32 bit words are read from the memory system into the grantee. The two LSBs of the address indicate the desired first word, and, therefore, the ordering of the remaining three words. If another device has the data and is master (of the data), then it will assert MnAbort and supply the data. Otherwise, the memory must supply the data. During a ReadQuadRandom, if another device has the data, it must set its own shared flag and assert MnShared signaling to the requesting device that the data is shared. The supplier of the data may insert wait states prior to delivering the first word by holding MnDV high, but may not insert wait states thereafter.

Once the first word is transferred, the remaining three are transferred on each successive cycle without interruption.

ReadQuadRandom and ReadQuadStream behave identically on the Mbus and differ only in their interpretation by other devices on the bus. ReadQuadStream is used when data is being transferred out of the memory system to an external device. The data is not stored in the device and does not participate in the data sharing algorithm. Therefore, a ReadQuadStream never causes shared to be set. A ReadQuadRandom, however, does read data that will participate in the data sharing algorithm.

WriteSingle

A single 32 bit word is written from one device to all others containing the same data. A WriteSingle occurs when a device updates data that is shared. All devices monitor this command and update their memory if they have a match. Then they assert shared signaling the grantee that the data is still shared. If shared is not asserted, the grantee will know the data is no longer shared and will reset its shared flag. Additionally, the grantee sets its master flag and all devices receiving the data reset their master flag. Thus, there can only be one master at a time. Memory ignores this command.

Write I/O (fast)

A single 32 bit data word is written to an I/O address. The address on the Mbus during the address cycle, therefore, is interpreted as an I/O address. The receiver must be capable of receiving the data immediately as there is no mechanism for inserting wait states and no handshaking.

Read I/O (fast)

A single 32 bit data word is read from an I/O port. The address on the Mbus during the address cycle, therefore, is interpreted as an I/O address. Data must be supplied on the Mbus on the third cycle after the address cycle as there is no mechanism for inserting wait states. MnDV is also asserted by the slave at the same time it drives data on the bus. If no slave responds, then MnDV is not asserted and the current value of the Mbus is returned for data.

ReadMap
ReadMapSetRef
ReadMapSetRefSetDirty
WriteMap
WriteMapFlags

These commands provide communications with the map processor. WriteMap and WriteMapFlags change the contents of the map while ReadMap returns the contents of the map to the processor. ReadMapSetRef and ReadMapSetRefSetDirty are initiated by a device itself to obtain the virtual to real address mapping necessary to read or write data to or from memory. ReadMapSetRef is used whenever a read operation is being performed by the processor and it tells the map to set its referenced flag for this page, if not already set. The ReadMapSetRefSetDirty is used for a write operation and tells the map to set both the referenced and dirty flags, if not already set.

All commands contain one data word. However, this word is significant only for WriteMap and WriteMapFlags where it contains the map flag bits and the real page address (WriteMap command only). The address cycle contains the virtual page address.

Once the address cycle and data are sent by the grantee, control of the Mbus is handed off to the map processor (slave) and retained by it until after the data word for Done is received, after which the grantee resumes control of the Mbus. Protocol allows the map processor to perform ReadQuadRandoms and WriteQuadRandoms, and I/O Reads and Writes to the memory system once it has (slave) control of the bus. However, with the current implementation of the (ED) cache the page address must not match any page in any cache and the I/O must not be directed to any cache.

IOReadFlow

This command uses the same command decode and timing as the ReadMap command. The address cycle specifies an I/O address3 from which data is to be read. The data cycle can contain valid data to be written to the slave device, if it is so designed to accept it. Control of the bus is handed over to the slave device after the data cycle. The slave responds with a Done command, returning the requested data in the data cycle of the Done command.

IOWriteFlow

This command uses the same MCmd decode and timing as the WriteMap command. The address cycle specifies an I/O address3 to which data is written. The data cycle contains the data to be written. Control of the bus is handed over to the slave device after the data cycle. The slave responds with a Done command and returns data which may or may not have significance, depending on the slave.

Done

Done signals the grantee that the operation it requested is complete. When this is a response to a map operation the address cycle contains four flag bits, three order bits, and a real page address. The four flag bits contain flag values for the page being mapped and they are returned to the processor for a ReadMap, WriteMap and WriteMapFlags operation. The three order bits direct all devices with a match on the real page address to reset certain flags, or for the initiating device to set certain flags or be notified that a fault occurred. Done is followed by a data cycle immediately after the address cycle which contains a repeat of the real page address and flag bits (the order and command fields do not need to be repeated here).

When Done is in response to an IOReadFlow or IOWriteFlow, the order field in the address cycle must be a nop or fault. The remaining fields of the address cycle are don't cares. The data cycle contains the requested data in response to an IOReadFlow, and may be a don't care in response to an IOWriteFlow.

A Done command is always sent by a slave. Control of the Mbus is returned to the bus grantee after the data cycle of the Done. the grantee will either initiate another command immediately or relinquish the bus. In the case where it relinquishes the bus after a Done, if the order bits in the Done command reset either RPDirty or VPValid then the grantee must add two additional wait states after the data cycle of the Done before relinquishing the bus. Any other order, including nop, does not require the addition of any wait states.

Fault codes are primarily defined for the map processor. However, since a Done is also used in response to IOFlow commands, the fault code can be defined as needed for different devices with the exception of 11 which is reserved for indicating that no I/O device answered.

The following is a description of the data sharing/consistency algorithm.

Associated with each quadword in a cache are two flags referred to as shared and master. Whenever the shared flag is set, it implies that another cache may have this quadword. Therefore, if a quadword is present in more than one cache then the shared flag for that quadword is set in all caches in which that quadword resides. However, the master flag for a quadword will be set in at most one cache. When it is set, it indicates that that copy of the quadwaord is the most recently updated version.

The setting and resetting of the shared flag is done as follows: whenever a cache initiates a quadword read transaction, all other devices on the Mbus proceed to determine if any of them has a copy of the requested data while the memory is proceeding to access it. If so, one or more of them will assert shared to inform the requesting cache that the quadword is shared. All caches that asserted the shared line will also set their respective shared flags. The assertion of shared is done in the third clock of a quadword read for random quadword transactions. If shared is not asserted during the third clock, then the shared flag for that quadword in the requesting cache is reset.

When a processor writes to a quadword that is shared, then a WriteSingle is issued for that word. All caches on the bus check to see if they have this word, and if so, they update their copy and assert shared on the bus. If the issuing cache sees shared asserted, it knows the quadword is still shared. However, if it does not see shared asserted, then it knows it is no longer shared and resets its own shared flag.

The setting and resetting of the master flag is done as follows: whenever a processor writes into a quadword, the master flag for that quadword in that cache is set. If the quadword is shared WriteSingle is done as described earlier. This WriteSingle will reset the master flag for this quadword in any other cache if it is set.

As described earlier, all caches are monitoring the Mbus to determine if one of them has initiated a ReadQuadRandom transaction. When one of the caches initiates this transaction, then all of the others proceed to determine if they have a copy of the requested quadword. Any cache that has it will assert the shared line as described earlier. In addition, each cache determines if the master flag for that quadword is set. If so, it asserts the MnAbort line to inform the memory not to supply the data and stop driving the bus. That cache then proceeds to source the data on the bus.

The second use of the master flag is to determine whether a quadword should be written back to memory when a cache has to make room for a new quadword. This write back to memory is done only if the master flag is set.

The opertions described above are sufficient to guarantee that data consistency is maintained among multiple copies of a quadword. However, when a new quadword comes into existence through a WriteQuadStream, then all caches (including the initiating cache) that have that quadword must update them.

In addition, when a cache performs a ReadQuadStream and another cache has to supply the data, then the cache supplying the data will not alter the state of its shared flag. This is done to eliminate unwanted writethroughs if the data is not already shared.

A virtual memory space is all of virtual memory directly addressable by a processor. The current two bus formats restrict the size of a virtual memory space to 234 bytes (16 gigabytes). Different spaces are selected by a space ID. A space ID is assigned to each device. The map processor then uses it to determine the proper mapping correspondence. In essence, the space ID can be thought of as nothing more than an extension to the virtual address.

In order to manage memory more efficiently, both real memory and virtual memory are broken up into small, equal sized chunks called "pages". All locations within a virtual page contain the same attributes, i.e., write protect, dirty, referenced, etc. The virtual to real address mapping is done on a page basis. Within a given virtual address space one real page is assigned to at most one virtual page. It is possible for more than one virtual page to be assigned to the same real page provided each virtual page is in a different virtual address space[4]. However, a virtual page can never be assigned to more than one real page.

Currently, four different page sizes can be used, 512 bytes, 1024 bytes, or 4096 bytes. It is recommended that only one page size be used throughout a memory system at any given time. If different page sizes are used, then care must be taken during mapping operations to maintain accurate mapping information in all devices. Pages are always aligned to a page boundary: that is 512 byte pages are always aligned to 512 byte adresses, 1K pages to 1K addresses, etc. Although there are four different page sizes, all Mbus transactions that use page addresses (map ops and Done) always treat pag addresses on the bus as though they were 512 byte page addresses. The three least significant bits will then actually have significance depending on the page size in use. This keeps the most significant bits of the address aligned in the same place regardless of the page size.

Housekeeping Algorithm

Housekeeping is a term used to describe a group of operations in which each cache searches through its memory looking for data in a specific address range and then performs some operation on it. Currently, there are three housekeeping operations: demap, flush, and launder. Specifically, each of these operations does the following:

DeMap

Quadwords inside the specified range will have their VPValid and RPDirty flags reset. The data now remains in the cache as an orphan.

Flush

Quadwords inside the specified range are written to memory if they have their master flag set. Additionally, all quadwords inside the specified range have their VPValid, RPValid, and RPDirty flags reset.

Launder

Quadwords inside the specified range are written to memory if they have their master flag set, and the master flag is then reset.

IMPLEMENTATION NOTE: Since there are no restrictions on the Mbus activity during these operations, each device must insure that resetting of the various flags causes no ambiguous results.

Housekeeping is initiated by writing two words (32 bits each) into each cache, specifying the operation and the quadword addresses involved in that operation. Both words are written into mailbox addresses 14 and 15 using WriteI/O commands. When mailbox 15 is written, the housekeeping operation is initiated and each device will actively drive MnHousekeepingInProgress low until it has completed[5]. The initiating device will know all devices have completed when MnHousekeepingInProgress makes a low to high transition.

The quadword addresses involved in the operation are specified by trits. Trits specify a quadword address with certian address bits as a don't care value (they always match). The word written in mailbox 15 contains an address word and that in mailbox 14 a not address word. Whenever the same bit position in both words contains a zero than that bit position is a don't care value. All other bit positions then must compare with the address word. The specified operation is then applied to all quadwords whose address matches the trit address.

Assigned I/O spaces

Various I/O addresses on the Mbus are recognized by the cache. Specifically, caches contain mailbox registers that can be read and written. These addresses are a concatenation of a six bit cache ID, a mailbox address, and various other bits used to simplify decoding. In general, all I/O addresses within the first 64k should be considered reserved for caches.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A parallel data processor system for maintaining the consistency of data blocks, each block containing a plurality of bits of data and a master flag bit, said means for maintaining comprising:
    a main memory for storing blocks of data,
    a plurality of caches, each storing a plurality of addressable data blocks, each cache comprising a first and second data port and each data block comprising data and a master flag bit,
    one data bus connecting the main memory and the first port of all caches,
    a processor associated with each cache and connected to the second port of its associated cache,
    means in each cache for allowing the processor to write into an addressed data block comprising,
    (a) if the block is contained in the associated cache, means for setting the master flag in that cache, means for writing into any other cache that is sharing the block, means for resetting the master flag in all other caches, and means for allowing the processor to write into the block of the associated cache, or
    (b) if the block is not contained in the associated cache, means for reading the block from another cache if any other cache has the block with the master flag set for that block, or from main memory otherwise, means for setting the master flag in the associated cache and resetting the master flag in all other caches, and
    (c) means for allowing the processor to write into the block of the associated cache, and
    means each cache for allowing the processor to read from an addressed block comprising,
    (a) if the block is in the associated cache, means for allowing the associated processor to read from the block, or
    (b) if the block is not in the associated cache, means for reading it into the associated cache from the cache having the block in which the master flag is set, or for reading it from memory otherwise, and
    (c) means for allowing the associated processor to read from the block.

2. The system of claim 1 wherein said block of data comprises said bits of data grouped into a plurality of words, and wherein, when one cache writes into another cache having shared data, only the one word being modified is written.

3. The system of claim 1 wherein each block has a shared flag which signifies to the cache that the data is shared, further comprising a shared line connecting all caches, and,
    means within each cache for asserting the line by driving the line to its true value when a shared block of data is requested by another cache, means for setting the shared flag if the cache either asserts the line or requests the data and senses that another cache has asserted the line, and means for resetting the shared flag is the cache attempts to write data onto the bus to update the other caches that may be sharing the data and the shared line is not asserted by any other cache.

4. The system of claim 1 further comprising:
    means in each cache for performing a read-modify-write sequence between a processor and its associated cache and for preventing another processor from writing into the shared block in its associated cache for the duration of said sequence.

5. The method of maintaining consistency between data blocks, each having a master flag bit, in a parallel data processing system comprising a main memory and a plurality of cache memories connected by one data bus, when a processor associated with one cache initiates a read from or a write into its associated cache comprising the steps of:
    (A) in the case of a write by the processor into the cache data block, first
    if the block is in the cache and the data is shared with at least one other cache, writing into all caches having the shared data, and setting the master flag of the associated cache,
    if the block is not in the associated cache obtaining the block from one of the other caches if it has its master flag set, otherwise,
    getting the block from main memory,
    and in all cases, setting the block master flag of the associated cache, or
    (B) in the case of a read from a data block in the associated cache, first
    if the block is not in the associated cache, reading the block from any other cache which has the block in which the master flag is set, otherwise reading the block from main memory.

6. The method of claim 5 wherein the step of writing into all caches which share the data will result in the writing of only one word within said block.

7. The method of claim 5 further comprising:

if the block is shared, during a read-modify-write sequence between a processor and its associated cache, preventing another processor from writing into the shared block in its associated cache for the duration of said sequence.

8. The method of claim 5 further comprising:

using a shared flag in every cache as an indication that the data may be shared, when a first cache tries to write data into a second cache by transmitting the data onto the bus, having the second cache assert a shared line by driving the line to its true value if the data is shared, when the shared line is asserted true, having the first and second caches set the shared flag, and when said first cache tries to write data into the second cache and no other cache asserts the line true, resetting the shared flag.

9. In a system comprising a plurality of caches connected by one data bus, each said cache associated with a processor, a method of supplying a data block from a real memory or from a cache to its associated processor which requests data by addressing a virtual location comprising the steps of:

storing a plurality of data blocks in the cache, each block associated with a virtual page and block address and a real page and block address, supplying the data block in the cache to the processor if the block is stored in the cache in association with the virtual address, if the block is not stored therein, converting the virtual address into a real address in a means for mapping and transmitting it to all caches and memory, using this real address to read a data block from real memory if no other cache has the data with its master flag set, or to read the block from another cache if said cache has the data and its master flag set, storing this data block and its associated virtual and real addresses in cache, and supplying this block to the processor.

10. The method of claim 9 wherein the means for mapping receives the virtual page address from the cache, transmits to the cache the corresponding real page address, and wherein the cache adds the virtual block address to the real page address to form the real address.

11. The method of claim 9 wherein, if the virtual address which the cache receives from the processor has the same page address as a second virtual address already stored in the cache, combining the real page address associated with the second virtual address with the block address of the virtual address received from the processor to form a complete real address which can be used to read data from said main memory.

12. The method of claim 9, including the steps of invalidating the virtual page address corresponding to a real page address, establishing a new virtual page address corresponding to a real page address, receiving a real page address from said means for mapping corresponding to the virtual page address requested by said processor, and using the real address to access data in the cache, if a data block associated with that real address is present in the cache.

* * * * *